(12) United States Patent
Marty et al.

(10) Patent No.: US 9,886,624 B1
(45) Date of Patent: Feb. 6, 2018

(54) SYSTEMS AND METHODS FOR TRACKING DRIBBLING IN SPORTING ENVIRONMENTS

(71) Applicant: Pillar Vision, Inc., Menlo Park, CA (US)

(72) Inventors: Alan W. Marty, Menlo Park, CA (US); John Carter, Elkmont, AL (US); Simon Lucey, Pittsburgh, PA (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

(21) Appl. No.: 15/173,245

(22) Filed: Jun. 3, 2016

(51) Int. Cl.
*G06K 9/00* (2006.01)
*G06T 7/00* (2017.01)
*G06T 7/20* (2017.01)
*H04N 13/02* (2006.01)

(52) U.S. Cl.
CPC ..... *G06K 9/00342* (2013.01); *G06K 9/00362* (2013.01); *G06K 9/00382* (2013.01); *G06K 9/00724* (2013.01); *G06T 7/0044* (2013.01); *G06T 7/20* (2013.01); *G06T 2207/30224* (2013.01); *G06T 2207/30241* (2013.01)

(58) Field of Classification Search
USPC ....... 382/100, 103, 106–107, 162, 168, 173, 382/181, 189, 192, 209, 219, 232, 254, 382/274, 276, 286–295, 305, 312, 321; 473/447; 1/1; 463/37; 700/91; 348/46
See application file for complete search history.

(56) References Cited

U.S. PATENT DOCUMENTS

| | | |
|---|---|---|
| 6,148,271 A | 11/2000 | Marinelli |
| 7,850,552 B2 | 12/2010 | Marty et al. |
| 7,854,669 B2 | 12/2010 | Marty et al. |
| 8,409,024 B2 | 4/2013 | Marty et al. |
| 8,579,632 B2 | 11/2013 | Crowley |
| 8,597,095 B2 | 12/2013 | Crowley |
| 8,622,832 B2 | 1/2014 | Marty et al. |
| 8,908,922 B2 | 12/2014 | Marty et al. |
| 8,948,457 B2 | 2/2015 | Marty et al. |
| 8,951,106 B2 | 2/2015 | Crowley |
| 9,257,054 B2* | 2/2016 | Coza ................. G09B 19/0038 |

(Continued)

OTHER PUBLICATIONS

Marty, et al, U.S. Appl. No. 14/874,555, entitled, "Systems and Methods for Monitoring Objects in Athletic Playing Spaces," filed Oct. 5, 2015.

*Primary Examiner* — Seyed Azarian
(74) *Attorney, Agent, or Firm* — Maynard Cooper & Galo, P.C.; John E. Holland

(57) ABSTRACT

Systems and methods are provided for tracking a dribbling motion associated with a person engaged in either a training session for a sporting event or the live play of the sporting event. In sporting events, a dribbling motion can be associated with a repetitive movement or a short trajectory sequence between changes of direction of a ball, puck or other object used in the sporting event. The repetitive movement or short trajectory sequence used for dribbling can involve an up-and-down movement such as in basketball or a back-and-forth movement such as in soccer or hockey. The system can use one or more cameras to capture images of a person dribbling an object and at least one processor to analyze the images to determine and evaluate one or more characteristics associated with the dribbling motion.

26 Claims, 6 Drawing Sheets

(56) References Cited

U.S. PATENT DOCUMENTS

| | | | |
|---|---|---|---|
| 9,275,470 B1* | 3/2016 | Forkosh | G06T 11/60 |
| 9,298,418 B2 | 3/2016 | Crowley | |
| 2008/0200287 A1 | 8/2008 | Marty et al. | |
| 2008/0312010 A1* | 12/2008 | Marty | A63B 24/0003 |
| | | | 473/447 |
| 2014/0081436 A1* | 3/2014 | Crowley | A63B 24/0062 |
| | | | 700/91 |
| 2014/0364233 A1* | 12/2014 | Fujishiro | A63F 13/211 |
| | | | 463/37 |
| 2015/0332450 A1* | 11/2015 | Marty | A63B 24/0003 |
| | | | 348/46 |

* cited by examiner

SYSTEMS AND METHODS FOR TRACKING DRIBBLING IN SPORTING ENVIRONMENTS

BACKGROUND

Athletes often spend countless hours training in order to improve their skill level so that they can become more competitive in sporting events, such as basketball games, soccer games, hockey games, and games of other sports. In an effort to assist athletes in improving their skill level, systems have been developed that track an athlete's performance while training or playing a game and then provide feedback indicative of the performance. Such feedback can then be evaluated for helping the athlete to improve his skill level. As an example, commonly-assigned U.S. Pat. No. 7,094,164 describes a system that tracks the trajectory of a basketball during a basketball shot so that the shooter can use feedback from the system for the purpose of improving his skill at shooting basketballs.

Tracking the performance of a dribbler, such as a basketball, soccer, or hockey dribbler, presents various challenges that may limit the effectiveness of a tracking system that attempts to assess dribble performance. As an example, a dribble is often very short in duration and can occur at relatively high speeds with the ball or puck changing direction and speed frequently. Further, the ball or puck being dribbled often becomes at least temporarily hidden from view by players as they dribble or guard against the dribbler making it difficult to consistently and accurately track the dribbles over time. Further, unlike some other activities, such as shooting a basketball where an ideal trajectory can be characterized through certain parameters (e.g., entry angle) that do not significantly vary from shot-to-shot, the characteristics of an ideal dribble can vary drastically depending on the dribbler's situation making it difficult to accurately assess the dribbler's performance and skill level. Due to these and other challenges, very few attempts have been made to develop systems that attempt to track dribble performance for training or coaching purposes.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

DETAILED DESCRIPTION

Systems and methods are provided for tracking a dribbling motion associated with a person engaged in either a training session for a sporting event or the live play of the sporting event. In sporting events, a dribbling motion can be associated with a repetitive movement or a short trajectory sequence between changes of direction of a ball, puck or other object used in the sporting event. The repetitive movement or short trajectory sequence used for dribbling can involve an up-and-down movement such as in basketball or a back-and-forth movement such as in soccer or hockey. The system can use one or more cameras to capture images of a person dribbling an object and at least one processor to analyze the images to determine and evaluate one or more characteristics associated with the dribbling motion. The characteristics can be related to dribble type, dribble posture, and dribble attributes.

Figure 1:
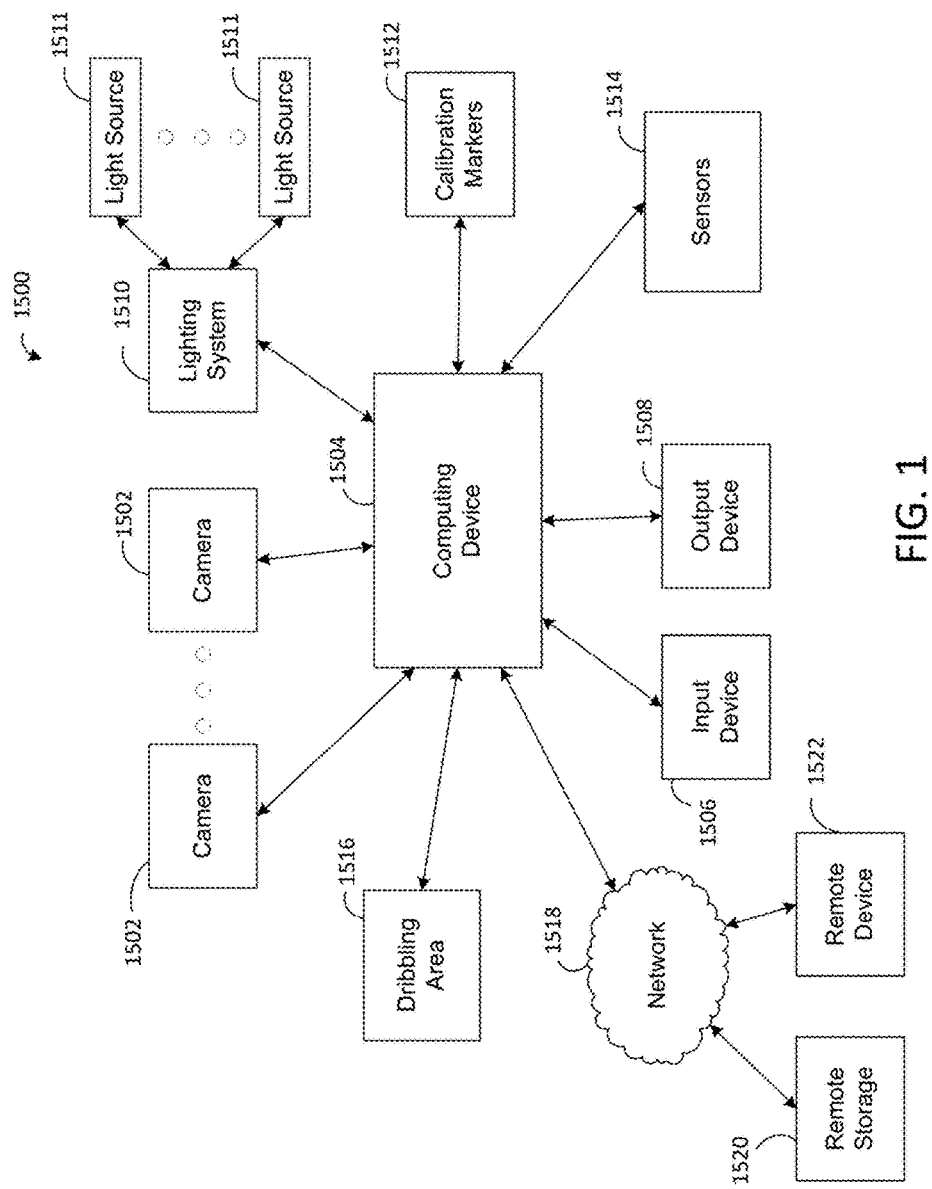
FIG. 1 is a block diagram of an embodiment of a dribbling motion tracking system.

FIG. 1 shows an embodiment of a system 1500 for tracking dribbling motions. For illustrative purposes, the system 1500 will be described in the context of dribbling a basketball. However, the system can be used with dribbling in other sports, e.g., soccer, hockey, or field hockey, and the system may be particularly useful for tracking objects in sports, such as foosball, air hockey, table tennis, etc., that involve repetitive movements or short trajectory sequences between changes of direction of an object used by the sport.

The system 1500 can include at least two depth sensing cameras 1502 or other types of cameras communicatively coupled to a computing device 1504. The cameras 1502 can be positioned around and/or above an athletic playing surface (such as a basketball court or other type of dribbling area 1516) and used to capture images of a person dribbling a basketball. Various locations of the cameras 1502 are possible. As an example, cameras 1502 may be positioned on opposite sides of the dribbling area 1516 so that the basketball is visible to at least one of the cameras 1502 regardless of the direction that the person is facing or which side of the person's body that the basketball is located. At least one camera 1502 may be mounted on a ceiling or a goal (e.g., the backboard of a basketball goal or a pole that is coupled to the basketball goal).

The cameras 1502 can provide the captured images to the computing device 1504 as camera data. The computing device 1504 can analyze the camera data from the cameras 1502 to track the dribbling motion of the ball and determine and/or evaluate one or more characteristics of the dribbling motion, such as: the type of dribble, e.g., a cross-over dribble, a behind-the-back dribble, a between-the-legs dribble, etc.; the posture of the person performing the dribble, e.g., dribble stance, body motion and hand performing the dribbling; and the attributes of the dribbling, e.g., ball speed, dribble height, repetition rate, power, direction and turnovers.

In one embodiment, the type of dribble can refer to typical dribbling movements associated with the game of basketball. A cross-over dribble can refer to the movement of the ball from one hand of the player to the other hand of the player with a single dribble (or bounce) of the ball in front of the person. A behind-the-back dribble can refer to the movement of the ball from one hand of the player to the other hand of the player with a single dribble (or bounce) of the ball behind the person A between-the-legs dribble can refer to the movement of the ball from one hand of the player to the other hand of the player with a single dribble (or bounce) of the ball underneath the torso of the person such that the ball travels "between the legs" of the person. As will be described in more detail below, the computing device 1504 can determine the type of dribble by analyzing the motion of the ball relative to identified body parts (e.g., torso, legs, hands, etc.) of the person dribbling the ball.

In another embodiment, the dribbling attributes can refer to typical attributes associated with a dribbling motion. Ball speed can refer to the velocity of the ball as it travels to and from a person's hand. Dribble height can refer to the distance between the person's hand and the athletic playing surface. Repetition rate can refer to the number of times the ball leaves and returns to the person's hand in a defined time period. Power can refer to the amount of force applied to the ball by the person's hand. Turnovers can generally refer to a loss of control of the ball by the person dribbling the ball. As an example, a turnover can be detected when the ball transfers directly from the person dribbling to a player on another team or to an out-of-bounds area.

The system 1500 can have an input device 1506 and an output device 1508 communicatively coupled to the computing device 1504. The input device 1506 can be any device or mechanism, e.g., a tag, that can be used to identify the ball or the person dribbling the ball. As an example, the input device 1506 may be worn by a player and wirelessly communicate with the computing device 1504 information that identifies the player or provides other information about the player. In other example, the input device 1506 may be configured to receive manual inputs from the player and wirelessly transmit to the computing device 1504 information submitted by the player, such as information that identifies the player or provides other information about the player. The identification process using the input device 1506 may occur automatically during the initialization of the system 1500 or may require one or more actions by the person such as standing in a predefined location or performing a predetermined action. The output device 1508 can be a display screen or other similar output device that can provide the person with training or other information associated with a dribbling motion, e.g., a dribbling sequence to be repeated, and the results of the training or testing process.

In one embodiment, the input device 1506 and the output device 1508 are integrated into a single apparatus, such as a smartphone or other mobile device. Before gameplay or training, a user may use such apparatus to input information and thereafter to receive feedback from the computing device 1504 indicative of performance results or other training information.

The computing device 1504 can be communicatively coupled to a lighting system 1510 to control the lighting effects, e.g., brightness and direction of light, in the area where the person is dribbling the ball. In one embodiment, the lighting system 1510 can include one or more light sources 1511. The light sources 1511 may include an incandescent bulb, a light emitting diode (LED), or a fluorescent light that is assembled into a lamp or lighting fixture. Yet other types of light sources 1511, including light sources providing light or radiation that is not visible to the human eye, e.g., infrared or ultraviolet light sources, are possible in other embodiments. Depending on the type of light source 1511 that is used, the cameras 1502 can be selected and/or configured to detect the light or radiation from the corresponding light source 1511. For example, if a light source 1511 provides infrared radiation, the camera 1502 can be equipped with an infrared sensor to detect the infrared radiation from the light source 1511.

The computing device 1504 can be used to control the lighting state, e.g., the on-state or the off-state, the lighting output aperture position, e.g., all light can exit or a reduced quantity of light can exit, and/or the lighting output intensity, e.g., a high intensity output or a low intensity output, of the light sources 1511 of the lighting system 1510. In addition, the light sources 1511 may include one or more reflectors that can be adjusted by the computing device 1504 to change the direction of the light output by the light sources 1511. Further, the lighting system 1510 may include one or more mechanisms, e.g., a track and motorized trolley, for the light sources 1511 to permit the position and/or orientation of the light sources 1511 to be adjusted by the computing device 1504. The computing device 1504 may be configured to submit to the lighting system 1510 commands for controlling the states of the light sources 1511 based on an analysis of the images received from the cameras 1502 by the computing device 1504 in an effort to achieve more optimal lighting conditions for analyzing the captured images.

The system 1500 can also include calibration markers 1512, such as LED (light emitting diode) lights designed to emit light at a specific color or objects that have been colored a specific color, which the computing device 1504 can use in calibrating (or re-calibrating) the camera data from the cameras 1502. The calibration markers 1512 can be identified in an image and used as a reference point that corresponds to a known location. To facilitate identification of the markers 1512, the color of the markers can be set to a predefined color (which may be a color rarely found in the natural environment) for which the computing device 1504 searches in the images received from the cameras 1502. Once the computing device finds the markers 1512 in the received images, the computing device 1504 can then use the markers 1512 as reference points when calibrating camera data from different cameras 1502. By having known reference points within the images, the computing device 1504 is able to identify the pixels in different sets of camera data from the cameras 1502 that are showing the same "items" from different fields of view based on the recognition of the known reference point in the different images. In one embodiment, the calibration markers 1512 can be incorporated as light sources 1511 in the lighting system 1510. In other embodiments, other types of markers, such as court markings can be used as known reference points.

In one example, assume that multiple cameras 1502 simultaneously capture an image of a ball that is analyzed by the computing device 1504. Using the markers 1512 in each of the images from the different cameras 1502, the computing device 1504 can correlate the pixel representing one physical location in one image from one camera 1502 with a pixel representing the same physical location in another image from another camera 1502. That is, the pixel coordinates from multiple cameras can be synchronized to a global coordinate system using the markers 1512 as references. Thus, the location of the ball at a given instant can be accurately determined in space relative to the global coordinate system using any of the images captured by any of the cameras 1502. Therefore, as the ball moves in and out of the views of the multiple cameras (e.g., the ball may be shielded from view of one camera 1502 while visible to another camera 1502 as a player changes dribbles or turns his body), the location of the ball relative to the global coordinate system at any given instant can be accurately determined from the images by the computing device 1504 as long as the ball is in the field of view of at least one camera 1502. Thus, over time, the location of the ball can be accurately and consistently tracked with multiple cameras 1502 as the ball comes in and out of the camera views.

One or more sensors 1514, such as accelerometers or other similar types of sensors, can provide position, movement and/or acceleration information to the computing device 1504 for use in determining dribbling motions and/or dribbling characteristics. In one embodiment, the sensors 1514 can be incorporated into the ball and/or attached to or included with the person dribbling the ball, and information from the sensors can be wirelessly transmitted to the computing device 1504.

The dribbling area 1516 can have one or more sensors that can provide information on the person and the dribbling motion to the computing device 1504. For example, the dribbling area 1516 can have one or more sensors embedded in the floor of the dribbling area 1516, positioned around the perimeter of the dribbling area 1516 or otherwise associated with the dribbling area 1516. The sensors can include any combination of optical sensors, proximity sensors, infrared sensors, magnetic sensors, touch sensors, height sensors, temperature sensors, pressure sensors or any other appropriate type of sensor. The sensors used with dribbling area 1516 can provide information on the location of the person in the dribbling area 1516 and the location and movement of the ball in the dribbling area 1516 based on the signals provided by the sensors. In one embodiment, the dribbling area 1516 can be a bounded area to prevent the ball from leaving the dribbling area 1516 while the system 1500 is tracking the dribbling motion.

The computing device 1504 can be communicatively coupled to a network 1518, such as a local area network (LAN) or wide area network (WAN), to permit the computing device 1504 to communicate with remote storage systems 1520 and remote devices 1522. In one embodiment, the network 1518 can be the Internet. The remote storage systems 1520 can be used to remotely store camera data, dribbling motion and characteristic information and other information generated and/or obtained by the computing device 1504. The remote device 1522 can be used to display camera data and/or dribbling motion and characteristic data generated or obtained by the computing device 1504. In one embodiment, the remote device 1522 can be a hand-held device such as a smartphone or tablet computer. In another embodiment, the remote device 1522 can be used in place of the output device 1508.

The computing device 1504 can communicate wirelessly, i.e., via electromagnetic or acoustic waves carrying a signal, with the other components of the system 1500, but it is possible for the computing device 1504 to communicate with the other components of the system 1500 over a conductive medium (e.g., a wire), fiber, or otherwise. In one embodiment, one or more of the system components (besides the computing device 1504) can communicate directly with one another (without having to communicate with the computing device 1504) over a wireless or wired connection. For example, each of the cameras 1502 may communicate directly with one another to synchronize a start time of the cameras 1502 or otherwise to synchronize the cameras 1502 or the data captured by the cameras 1502. In another example, a camera 1502 may communicate directly with lighting system 1510 to change lighting conditions when the camera 1502 detects less than optimal lighting conditions.

In one embodiment, the cameras 1502 and the light sources 1511 of the lighting system 1510 can be stationary. However, in other embodiments, one or more of the cameras 1502 and the light sources 1511 may be portable. Each of the cameras 1502 and the light sources 1511 may be positioned at a specific location relative to the athletic playing surface.

One or more of the cameras 1502 may be automatically rotated or pivoted either horizontally and/or vertically in order to adjust the field of view of the camera 1502 without changing the location of the camera 1502. Similarly, one or more of the light sources 1511 of the lighting system 1510 may be automatically rotated or pivoted either horizontally and/or vertically in order to adjust the output direction of the light source 1511 without changing the location of the light source 1511. In one embodiment, the rotating or pivoting of the cameras 1502 and/or light sources 1511 may be pre-programmed into the cameras 1502 and/or light sources 1511 such that the cameras 1502 and/or light sources 1511 are rotated or pivoted according to a predetermined sequence. In another embodiment, the rotating or pivoting of the cameras 1502 and/or light sources 1511 may be in response to instructions provided to the cameras 1502 and/or light sources 1511 by a user, the computing device 1504, or other device.

Figure 2:
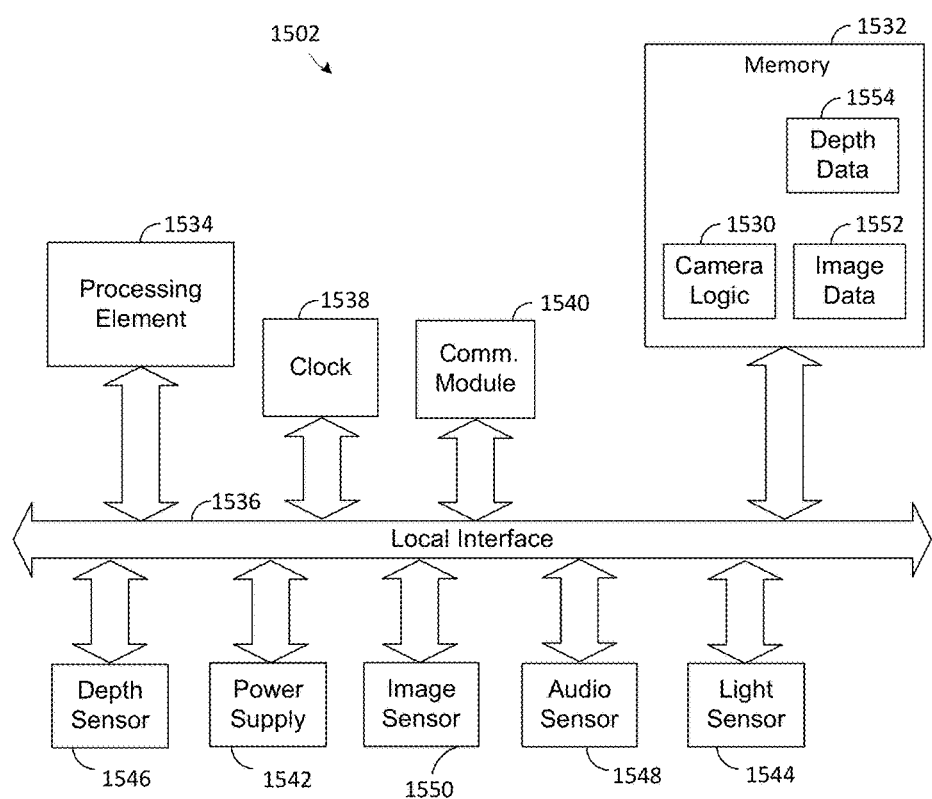
FIG. 2 is a block diagram of an embodiment of a camera used in the tracking system of FIG. 1.

FIG. 2 shows an embodiment of a camera 1502 that can be used with the tracking system 1500. The camera 1502 shown in FIG. 2 can include logic 1530, referred to herein as "camera logic," which may be implemented in software, firmware, hardware, or any combination thereof. In FIG. 2, the camera logic 1530 is implemented in software and stored in memory 1532. However, other configurations of the camera logic 1530 are possible in other embodiments. The camera logic 1530, when implemented in software, can be stored and transported on any computer-readable medium for use by or in connection with an instruction execution apparatus that can fetch and execute instructions.

The embodiment of the camera 1502 shown in FIG. 2 can include at least one conventional processing element 1534, which can incorporate processing hardware for executing instructions stored in the memory 1532. As an example, the processing element 1534 may include a central processing unit (CPU), a digital signal processor (DSP), a graphic processing unit (GPU) and/or a quantum processing unit (QPU). The processing element 1534 can communicate to and drive the other elements within the camera 1502 via a local interface 1536, which can include at least one bus. The camera 1502 can have a clock 1538, which can be used to track time and synchronize operations with the other cameras 1502.

The camera 1502 can have a communication module 1540. The communication module 1540 can include a radio frequency (RF) radio or other device for communicating wirelessly with computing device 1504 or other components of system 1500. The power supply 1542 has an interface that allows it to plug into or otherwise interface with an external component, such as a wall outlet or battery, and receive electrical power from the external component.

As shown by FIG. 2, the camera 1502 can also include an image sensor 1550, a depth sensor 1546, an audio sensor 1548 and a light sensor 1544. The image sensor 1550 can be used to record, capture or obtain images or videos of the area surrounding or in proximity to the camera 1502. In one embodiment, the image sensor 1550 is configured to capture two dimensional (2-D) video images of the playing area including images of the object being dribbled, the person performing the dribbling and any other players in the athletic playing area. The depth sensor 1546 can be used to determine a relative distance (with respect to the depth sensor 1546) of objects in the field of view of the camera 1502. The audio sensor 1548 or microphone can be used to record sound or noise occurring in the area surrounding or in proximity to the camera 1502. The light sensor 1544 can be configured to sense ambient light in the area surrounding the camera 1502.

The image sensor 1550 can include one or more CCDs (charge coupled devices) and/or one or more active pixel sensors or CMOS (complementary metal-oxide-semiconductor) sensors. The images or videos from the image sensor 1550 can be stored as image data 1552 in memory 1532. In one embodiment, the image data 1552 may define frames of the captured images. The image data 1552 can be stored in any appropriate file format, including, but not limited to, PNG (portable network graphics), JPEG (joint photographic experts group), TIFF (tagged image file format), MPEG (moving picture experts group), WMV (Windows media video), QuickTime and GIF (graphics interchange format). The sound recordings from audio sensor 1548 may be incorporated into the video file from the image sensor 1550 and stored in image data 1552. If the sound recording from the audio sensor 1548 is not part of the video file, then the sound recording can be stored in any appropriate file format, including, but not limited to, WAV (waveform audio), MP3 (MPEG Layer III Audio), WMA (Windows media audio) and MPEG and saved in image data 1552 or elsewhere in memory 1532.

In one embodiment, for each frame of image data 1552, the depth sensor 1546 can provide a depth map indicating a respective depth for each pixel of the image frame. The depth maps provided by the depth sensor 1546 can be stored as depth data 1554 in memory 1532. Note that the depth sensor 1546 may be oriented such that the distance measured by the depth sensor 1546 is in a direction that is substantially normal to the plane of the 2D coordinate system used by the image sensor 1550, although other orientations of the depth sensor 1546 are possible in other embodiments.

From time-to-time, the camera logic 1530 can be configured to transmit the image data 1552 and the depth data 1554 to the computing device 1504. The image data 1552 and the depth data 1554 may be analyzed by the computing device 1504 to track the dribbling motion of the ball and determine one or more dribbling characteristics from the dribbling motion. The image data 1552 and the depth data 1554 can be time-stamped based on the time indicated by the clock 1538 in order to indicate when the image data 1552 and the depth data 1554 were obtained. Thus, upon receiving the image data from multiple cameras 1502, the computing device 1504, based on the timestamps, can determine which image frames from multiple cameras 1502 were captured at substantially the same time in order to facilitate tracking of ball movement. From time-to-time, the cameras 1502 may communicate with each other and/or the computing device 1504 in order synchronize their clocks so that a comparison of a timestamp for an image frame from one camera 1502 with a timestamp for an image frame of another camera 1502 accurately indicates the time difference that the two image frames were captured. The image data 1552 and the depth data 1554 may be presented to a user for analysis or review.

Various types of image sensors 1550 and depth sensors 1546 may be used in camera 1502. In one embodiment, the camera 1502 can be implemented using a KINECT® camera system sold by Microsoft Corporation. In such a camera, the image sensor 1550 and depth sensor 1546 are integrated into the same housing. The image sensor 1550 is configured to capture a video stream comprising frames of video data in which each frame is defined by a plurality of pixels. Each pixel is associated with two coordinates, an x-coordinate and a y-coordinate, representing a location in 2D space. For each frame, each pixel is assigned a color value (which may include a red component (R) value, a blue component (B) value, and a green component (G) value) indicative of the color of light received by the image sensor 1550 from the location in 2D space corresponding to the pixel's coordinates. Further, for each pixel, the depth sensor 1546 measures the distance from the depth sensor 1546 to the real world object that is at the pixel's corresponding location in 2D space. The distance (which, as described above, may be in a direction substantially normal to the plane of the 2D coordinate system used by the image sensor 1550) may be referred to as the "depth" of the corresponding pixel. Using the image data 1552 from the image sensor 1550 and the depth data 1554 from the depth sensor 1546, the location of an object captured by the image sensor 1550 can be determined in 3D space. That is, for a point on the object, its x-coordinate and y-coordinate from the image data 1552 provided by the image sensor 1550 indicate its location along two axes (e.g., the x-axis and y-axis), and the point's depth value from the depth sensor 1546, which may be referred to as the "z-coordinate," indicates its location along a third axis (e.g., the z-axis). Notably, the coordinate system defined by the three axes is not necessarily relative to gravity. That is, depending on the orientation of the camera 1502, gravity may be in any direction relative to the axes of the coordinate system. Thus, unless a calibration process is performed, the direction of gravity relative to the coordinate system may be unknown. An example of a calibration process for determining the direction of gravity relative to the coordinate system is described by: U.S. patent application Ser. No. 14/874,555, entitled "Systems and Methods for Monitoring Objects in Athletic Playing Spaces" and filed on Oct. 5, 2015, which is incorporated herein by reference.

In one embodiment, the depth sensor 1546 has a wave emitter (e.g., an infrared laser projector or other type of emitter) and a wave sensor for sensing reflections of the energy emitted by the wave emitter. The wave emitter emits infrared radiation at various wavelengths into free space, although radiation at other wavelengths outside of the infrared spectrum (e.g., visible light) may be emitted in other embodiments, and the wave sensor senses the reflected energy to capture a video stream having frames of video data. Each frame of the depth data 1554 from the sensor 1546 corresponds to a respective frame of image data 1552 from the image sensor 1550. Further, a pixel of a frame of the depth data 1554 corresponds to (e.g., has the same x- and y-coordinates) and indicates the depth for at least one corresponding pixel in the image data 1552 from image sensor 1550.

In this regard, for a frame of video data captured by the depth sensor 1546, the depth sensor 1546 converts the frame to a depth map by assigning each pixel a new color value (referred to herein as "depth value") representative of the pixel's depth. Thus, when the depth map is displayed, objects displayed as the same color within the image should be approximately the same distance away from the depth sensor 1546, noting that it is often unnecessary for the depth map to actually be displayed during operation.

As described above, a given pixel of the image data 1552 from the image sensor 1550 is associated with an x-coordinate and y-coordinate indicative of the pixel's location in 2D space, and the pixel is associated with a depth value from a corresponding pixel in the depth data 1554 provided by the depth sensor 1546 indicative of the pixel's z-coordinate. The combination of the x-coordinate, y-coordinate, and z-coordinate defines the pixel's location in 3D space relative to the coordinate system of the image sensor 1550. That is, the x-coordinate, y-coordinate, and z-coordinate define the location of the point from which light measured for the pixel was reflected toward the image sensor from an object.

Figure 3:
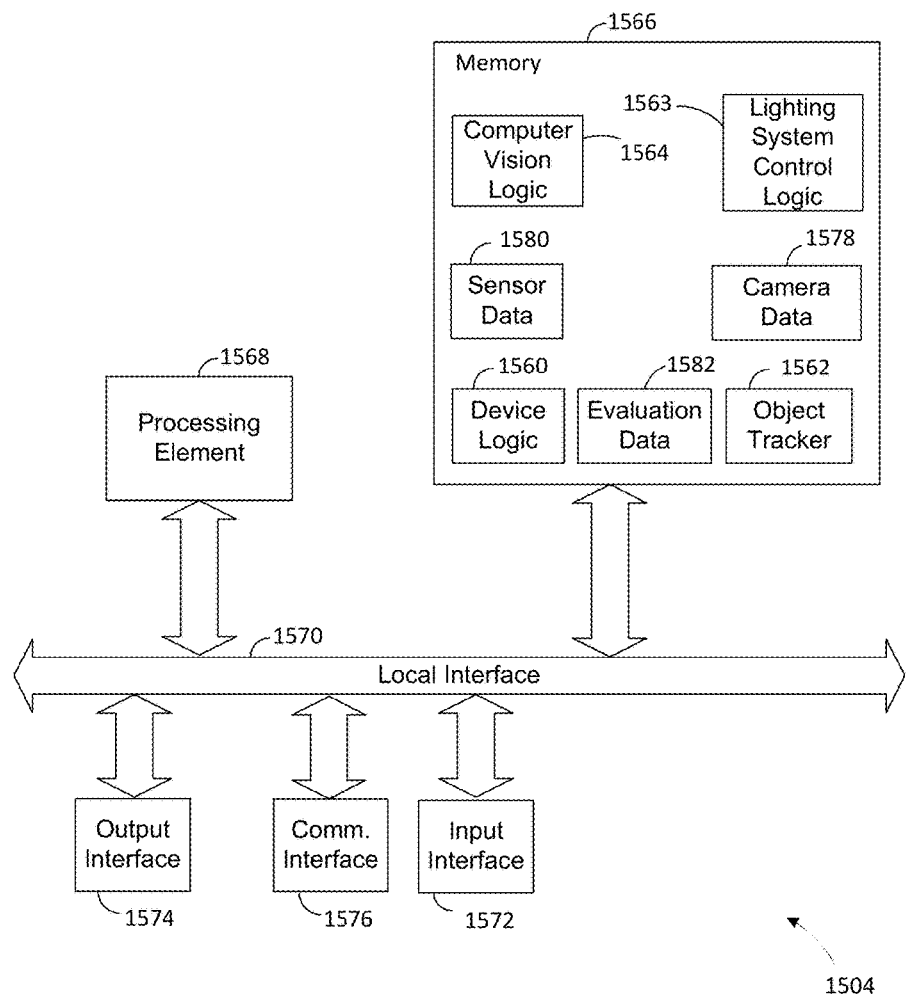
FIG. 3 is a block diagram of an embodiment of a computing device used in the tracking system of FIG. 1.

FIG. 3 shows an embodiment of the computing device 1504. The computing device 1504 may be implemented as one or more general or special-purpose computers, such as a laptop, hand-held (e.g., smartphone), desktop, or mainframe computer. The computing device can include logic 1560, referred to herein as "device logic," for generally controlling the operation of the computing device 1504, including communicating with the other components of the system 1500. The computing device 1504 also includes logic 1562, referred to herein as an "object tracker," to determine the position and movement of the object, the person handling the object, and any other persons in the athletic playing area and lighting system control logic 1563 to control the lighting system 1510 and the light sources 1511. The computing device 1504 further includes logic 1564, referred to herein as "computer vision logic," for processing and analyzing the image data 1552 and the depth data 1554 from the cameras 1502. The device logic 1560, the computer vision logic 1564, lighting system control logic 1563 and the object tracker 1562 can be implemented in software, hardware, firmware or any combination thereof. In the computing device 1504 shown in FIG. 3, the device logic 1560, the computer vision logic 1564, lighting system control logic 1563 and the object tracker 1562 are implemented in software and stored in memory 1566 of the computing device 1504. Note that the device logic 1560, the computer vision logic 1564, lighting system control logic 1563 and the object tracker 1562, when implemented in software, can be stored and transported on any non-transitory computer-readable medium for use by or in connection with an instruction execution apparatus that can fetch and execute instructions.

The computing device 1504 can include at least one conventional processing element 1568, which has processing hardware for executing instructions stored in memory 1566. As an example, the processing element 1568 may include a central processing unit (CPU), a digital signal processor (DSP), a graphic processing unit (GPU) and/or a quantum processing unit (QPU). The processing element 1568 communicates to and drives the other elements within the computing device 1504 via a local interface 1570, which can include at least one bus. Furthermore, an input interface 1572, for example, a keypad, keyboard or a mouse, can be used to input data from a user of the computing device 1504, and an output interface 1574, for example, a printer, monitor, liquid crystal display (LCD), or other display apparatus, can be used to output data to the user. In one embodiment, the input interface 1572 and the output interface 1574 can correspond to input device 1506 and output device 1508, respectively. Further, a communication interface 1576 may be used to exchange data among the components of the system 1500 or with network 1518 as shown in FIG. 1.

As shown by FIG. 3, sensor data 1580, evaluation data 1582 and camera data 1578 can be stored in memory 1566 at the computing device 1504. The camera data 1578 can include image data 1552 and depth data 1554 from cameras 1502. The sensor data 1580 can include data and measurements from sensors 1514 (e.g., accelerometers or other sensors) and/or any sensors incorporated in the dribbling area 1516. The camera data 1578, the sensor data 1580 and the evaluation data 1582 can be used and/or analyzed by device logic 1560, computer vision logic 1564 and/or object tracker 1562 to track the dribbling motion of an object and determine one or more characteristics of the dribbling motion.

The evaluation data 1582 can include information associated with one or more dribbling characteristics, such as, for example, the movements associated with particular dribbling types. The evaluation data 1582 can also include training information such as diagrams and videos that can be displayed on output device 1508 to provide training instructions on "proper" dribbling form and/or technique to a user. The evaluation data 1582 may include one or more testing procedures based on "proper" dribbling form that can be used to evaluate the dribbling motion associated with a user.

In one embodiment, the testing procedures can be displayed to the user on the output device 1508, and the object tracker 1562 can evaluate a user's performance with respect to the testing procedure in evaluation data 1582 based on the user's dribbling motion captured in camera data 1578.

The object tracker 1562 can receive camera data 1578, sensor data 1580, information from computer vision logic 1564 and/or other information relating to the ball and the person dribbling the ball to track the dribbling motion and determine one or more characteristics of the dribbling motion. Once a characteristic of the dribbling motion has been determined, the object tracker 1562 can compare the determined dribbling characteristic(s) to corresponding "proper" dribbling characteristic information in evaluation data 1582 to score or otherwise evaluate the determined dribbling characteristic(s). The "proper" dribbling characteristics stored in evaluation data 1582 can be preselected parameters or techniques that are associated with a preferred dribbling motion. In one embodiment, each determined dribbling characteristic can have a corresponding "proper" dribbling characteristic stored in evaluation data 1582. The proper dribbling characteristic may be a predetermined number such as a predetermined speed, a predetermined number of dribbles per minute or a predetermined number of turnovers. The proper dribbling characteristics may also be defined relative to the body of the person performing the dribbling, e.g., the dribble height should not exceed the waist of the person dribbling the ball. Further, the proper dribbling characteristics may be defined relative to actions of the person dribbling the ball, e.g., there may be one set of proper dribbling characteristics when the person is running and a different set of proper dribbling characteristics for when the person is walking or stationary. However, in other embodiments, some dribbling characteristics may not have a corresponding "proper" dribbling characteristic. In still other embodiments, the "proper" dribbling characteristic may be defined as a range, e.g., greater than a predetermined minimum, less than a predetermine maximum, or between a predetermined minimum and a predetermined maximum.

The computer vision logic 1564 can be used to analyze and process the image data 1552 and depth data 1554 from the cameras 1502 stored in camera data 1578. The computer vision logic 1564 can extract information from the image data 1552 and depth data 1554 in camera data 1578 using models, theories and other techniques to identify or recognize the object to be tracked and one or more participants (including the torso, arms, legs, hands, feet, etc., of the participants) involved in the athletic event associated with the object. The computer vision logic 1564 can use numerous techniques to identify or recognize objects and people such as content-based image retrieval, pose estimation, optical character recognition, 2D code reading, shape recognition, facial recognition, object recognition, pattern recognition and any other appropriate identification or recognition technique. Exemplary techniques for identifying and tracking players are disclosed in U.S. Provisional Application No. 62/297,528, entitled "Systems and Methods for Monitoring Objects at Sporting Events" and filed on Feb. 19, 2016, which is incorporated herein by reference.

In one embodiment, the computer vision logic 1564 can perform one or more of the following techniques and/or processes on the image data 1552 and depth data 1554 data from camera data 1578: pre-processing; feature extraction; detection/segmentation; high-level processing; and decision making. The pre-processing of the camera data 1578 can involve the processing of the data to confirm that the data is in the proper form for subsequent actions. Some examples of pre-processing actions can include noise reduction and contrast enhancement. After the camera data 1578 has been pre-processed, the camera data 1578 can be reviewed or analyzed to extract features, e.g., lines, edges, corners, points, textures and/or shapes, of various complexity from the camera data 1578. Next, in the detection/segmentation step, decisions can be made regarding the features and/or regions that are relevant and require additional processing. The high-level processing of the reduced set of camera data 1578 (as a result of the detection/segmentation step) involves the estimation of specific parameters, e.g., object size, and classifying of a detected object into categories. Finally, the decision making step makes a determination of the identity of the detected object or person or indicates that the detected object or person is not known.

The computer vision logic 1564 can identify objects and persons that are present in the camera data 1578 by processing the individual images and videos received from a camera 1502 and/or any combined or grouped images and videos based on camera data 1578 from multiple cameras 1502. The computer vision logic 1564 can identify objects or persons using labels carried by the objects or persons, facial recognition techniques (if identifying a person), profiling techniques (using the profile of the object or person) or any other suitable recognition techniques.

In one embodiment, the object or person can have a label that is attached or affixed to the object or person and that can be recorded by cameras 1502. If the person is carrying a tag, the label can be (but does not have to be) incorporated into the tag carried by the person. The computer vision logic 1564 can identify the label attached to the object or person and then identify the object or person based on stored information in memory 1566 correlating each label to an object or person. In another embodiment, the computer vision logic 1564 can identify a person using facial recognition or can identify an object or a person by using a distinguishable or identifiable profile or feature of the object or person. For example, the identification of a circular or spherical shape may indicate the presence of the ball in the frame. Similar to the process for identifying an object or person using a label, the computer vision logic 1564 can identify facial features and/or other profiles or features of the object or person in the camera data 1578 and then compare the identified facial features and/or other profiles or features of the asset to stored information in memory 1566 correlating information on features and/or profiles to an object or person.

The computer vision logic 1564 can send the camera data 1578 and/or information on the identified object or person from analyzing the camera data 1578 to the object tracker 1562. The object tracker 1562 can use information on the identified object and/or persons from the computer vision logic 1564 to determine a dribbling motion for the object and one or more dribbling characteristics associated with the dribbling motion. In one embodiment, the object tracker 1562 can use synchronized and calibrated camera data 1578 to determine a dribbling motion and corresponding dribbling characteristics. The synchronization and calibration of the camera data 1578 can be done by the computer vision logic 1564 or the object tracker 1562.

The synchronization of the camera data 1578 involves ensuring that the corresponding "frames" of camera data 1578 processed by the computer vision logic 1564 or the object tracker 1562 for a give sample were captured substantially at the same time. In this regard, a sample generally refers to data from measurements that were taken substantially at the same time. For example, at a given instant, an image of the ball may be captured by multiple cameras 1502. Further, the ball's position may be calculated from each of the images. Since the position data from the multiple cameras is based on image data captured substantially at the same time in such example, the measured positions are part of the same sample. In order to determine which frames were captured substantially at the same time, a global time system may be defined. As an example, the computing device 504 may maintain a global time system and adjust the timestamps from each of the cameras 1502 according to the global time system so that the timestamps are synchronized. That is, image captured at the same time should have the same adjusted timestamp. Alternatively, the computing device 1504 (or other device maintaining a global time system) may from time-to-time transmit timing information to the cameras 1504. The cameras 1504 may then use such information to adjust their respective clocks so that images having the same timestamps from the cameras 1504 were captured substantially at the same time. Alternatively, the computing device 1504 may analyze unsynchronized timestamps from the cameras 1502 and determine which frames were captured substantially at the same time. In such embodiment, the computing device 1504 may communicate with the cameras 1504 in a controlled calibration process in order to assess timing differences between the cameras 1504. As an example, each camera 1504 may report a current timestamp to the computing device in a handshake process so that the computing device 1504 can determine the camera's time relative to a global time system maintained by the computing device 1504 or otherwise. In other embodiments, other techniques for synchronizing the camera data are possible.

The calibration of the camera data 1578 involves the correlation of the pixels in an image frame to a global coordinate system such that the computing device 1504 is aware of which pixels in different frames from different cameras 1502 represent the same physical location in space. This may be achieved, for example, by ensuring that the pixels in "frames" from different cameras 1502 representing the same physical location are assigned the same global coordinates. By calibrating the camera data 1578, the object and the person dribbling the object can be tracked through multiple image frames from different cameras 1502 since the location of the object and the person dribbling the object, as defined in the global coordinate system, can be the same in each image frame regardless of the field of view of the camera 1502 capturing the image frame. Once the camera data 1578 is calibrated, the object tracker 1562 can track the object through multiple image frames as the object moves into and out of view individual image frames. If one or more cameras 1502 become misaligned, the calibration process can be repeated to calibrate the misaligned camera(s) 1502.

In one embodiment, the object tracker 1562 can determine a dribbling motion by analyzing successive frames of camera data 1578 to determine changes in the position and/or depth of the identified object and/or changes in the position of the person preforming the dribbling motion. The object tracker 1562 can determine a dribbling motion by detecting a downward trajectory (movement away from the person) of the identified object followed by a change of direction of the identified object (such as may be caused by the object contacting the athletic playing surface) and an upward trajectory (movement toward the person) of the identified object. Some exemplary techniques of calculating the trajectory of a ball that may be used by object tracker 1562 can be found in U.S. Pat. No. 8,908,922 entitled "True Space Tracking of Axisymmetric Object Flight Using Diameter Measurement" and U.S. Pat. No. 8,948,457 entitled "True Space Tracking of Axisymmetric Object Flight Using Diameter Measurement," both of which patents are hereby incorporated by reference. By identifying changes associated with the upward and downward trajectories of the object or the person dribbling the object, the object tracker 1562 can determine characteristics associated with the dribbling motion. In one embodiment, some of the dribbling characteristics can be determined using conventional mathematical and physics principles and equations based on trajectory information extracted from the camera data 1578. The determined dribbling characteristics can then be stored in memory 1566 and/or scored based on "proper" dribbling characteristics stored in evaluation data 1582.

As an example, the object tracker 1562 may analyze the trajectory of the ball and identify a plurality of dribbles. For one or more dribbles, the object tracker 1562 may determine a parameter indicative of a dribbling characteristic, such as ball speed, dribble height, repetition rate, type of dribble, etc., and store such parameters for analysis. In some cases, the object tracker 1562 may correlate a given parameter with information that can be used to characterize dribbling performance. For example, if a given dribble is performed with the left hand, the parameter determined for the dribble may be correlated in memory with a left hand identifier. Based on the parameters correlated with such identifier, the object tracker 1562 may calculate one or more scores or other statistics indicative of the player's performance with his left hand. As an example, an average repetition rate, ball speed, or dribble height for the player's left hand may be calculated. If a dribble type is identified for a particular dribble, as will be described in more detail below, the parameter determined for the dribble may be correlated in memory with a type identifier indicative of the dribble type. Based on the parameters correlated with such identifier, the object tracker 1562 may calculate one or more scores or other statistics indicative of the player's dribbling performance for the identified dribble type. If a particular defender can be identified as guarding the player, as will be described in more detail below, the parameter determined for the dribble may be correlated in memory with an identifier that identifies the defender. Based on parameters correlated with such identifier, the object tracker 1562 may calculate one or more scores or other statistics indicative of the player's dribbling performance against the defender. In other embodiments, the data can be grouped in other ways in order to provide further insight into the player's dribbling performance relative to certain conditions. Any of the parameters, scores, or other statistics described herein may be reported by the system to indicate one or more dribbling characteristics for the tracked player. Any such parameters, scores, or other statistics may be used in order to calculate an overall or combined assessment of the player's dribbling performance that may be reported.

Note that techniques other than or in addition to the identification of objects and/or persons by computer vision logic 1564 may be used by the object tracker 1562 to determine a dribbling motion and one or more characteristics associated with the dribbling motion. In one embodiment, sensor data 1580 may be analyzed by the object tracker 1562 to determine the location and movement of an object and/or person. The sensor data 1580 can then be used to determine dribbling motion and one or more characteristics associated with the dribbling motion.

Figure 4:
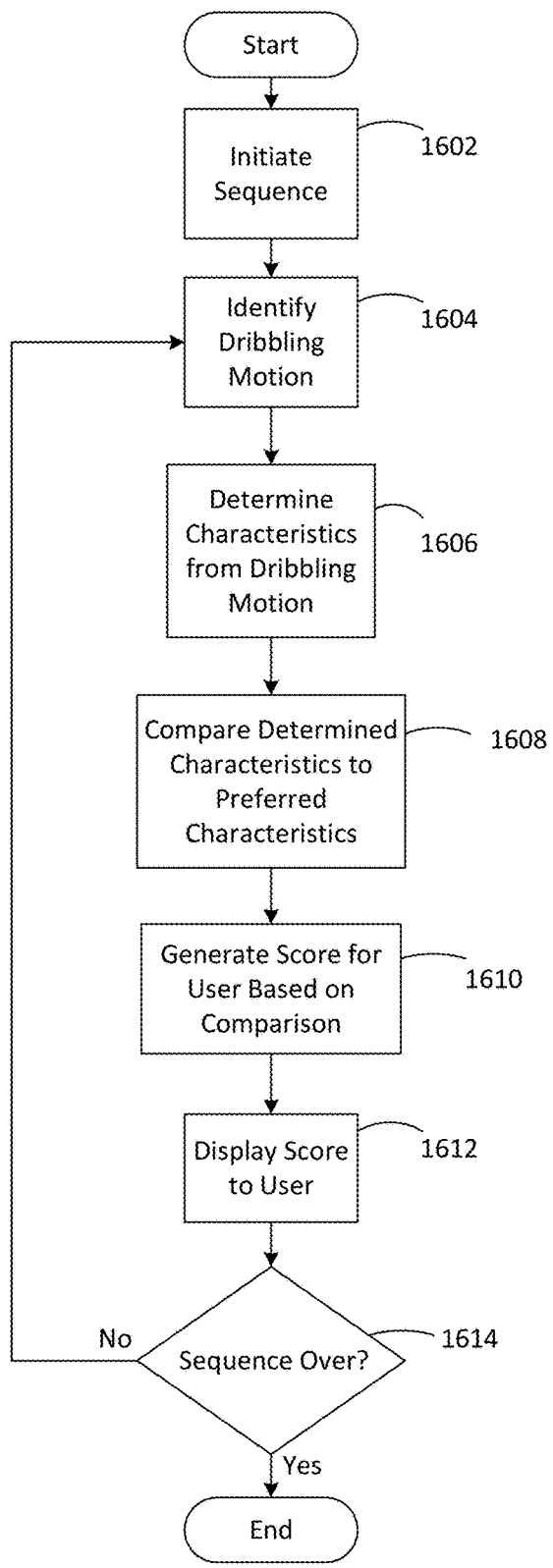
FIG. 4 is an information flow diagram of an embodiment of evaluating a dribbling motion during either a training sequence or a game sequence.

FIG. 4 shows an embodiment of a process for evaluating the dribbling motion of a user with the tracking system 1500 during either a training sequence (training mode) or a game sequence (game mode). The process begins with a user initiating either a training sequence or a game sequence with the tracking system 1500 being active (step 1602). If the tracking system 1500 is being used in a training mode, the user can select a desired training sequence from the computing device 1504 using input device 1506. The selected training sequence can then be displayed to the user using output device 1508. The computing device 1504 can store one or more training sequences in evaluation data 1582. The training sequences can provide instruction to the user on how to execute a particular dribbling motion. The training sequences can demonstrate the dribbling motion on the output device 1508 for the user to emulate. The user can then attempt to repeat the demonstrated dribbling motions, which user actions are captured by cameras 1502, during the training sequence. During a game sequence, the cameras 1502 may capture dribbling motions of the user during gameplay. The camera data 1578 from the cameras 1502 can be provided to computing device 1504 and processed by the computer vision logic 1564 to identify the object being dribbled, e.g., the ball, and the person performing the dribbling. The information from the computer vision logic 1564 can then be provided to the object tracker 1562 to identify the dribbling motion (step 1604) of the user.

The object tracker 1562 can identify the dribbling motion of the ball based on the identification information from the computer vision logic 1564, which identifies the ball, and the trajectory of the identified ball (including any corresponding changes in depth or position of the ball). Once the object tracker 1562 has identified the dribbling motion, the object tracker 1562 can identify one or more characteristics of the dribbling motion (step 1606). The object tracker 1562 can identify characteristics of the dribbling motion by analyzing the trajectory of the ball and the camera data 1578 associated with the ball and the person performing the dribbling motion.

The object tracker 1562 can determine the hand of the person, e.g., right hand or left hand, being used to perform the dribbling motion by identifying the face of the person (based on facial recognition data from the computer vision logic 1564) and then determining the side of the person that is associated with the detected dribbling motion. Alternatively, the object tracker 1562 can identify the person's left and right hands based on his body profile within the captured images. Once the object tracker 1562 has determined the hand of the person performing the dribbling motion (the "dribble hand"), the object tracker 1562 can then determine the dribbling characteristics for the dribbling motion performed with each hand of the person.

The object tracker 1562 can use the information on the dribble hand to determine several types of dribbling motions, e.g., cross-over dribbles, behind-the-back dribbles, or between-the-leg dribbles. The object tracker 1562 can review information from computer vision logic 1564 and dribble hand information to determine if a particular dribbling motion has been performed. In one embodiment, the object tracker 1562 can determine a cross-over dribble by checking for a change in the dribble hand for the person while the ball remains in front of the person. The object tracker 1562 can determine a between-the-legs dribble by checking for a change in the dribble hand for the person while the ball travels underneath the torso of the person, e.g., between the legs of the person, from the front of the person to the rear of the person. The object tracker 1562 can determine a behind-the-back dribble by checking for a change in the dribble hand for the person while the ball travels behind the person.

In another embodiment, the object tracker 1562 can determine one or more dribbling types based on a group of corresponding parameters that are determined by the object tracker 1562. Each dribbling type, e.g., a "back-to-front, between-the-legs dribble from right to left," can be defined as sequence or group of dribbling characteristics that can include a starting and/or ending dribble height, a dribble speed, a dribble direction, a starting and/or ending acceleration or deceleration, a spin on the ball, or a velocity of spin the ball. The object tracker 1562 can determine the particular dribbling characteristics occurring during a dribbling motion and then identify the type of dribble from the dribbling characteristics. Other techniques for detecting the types of dribbling motions can be used in other embodiments.

The object tracker 1562 can also determine other characteristics of the dribbling motion such as the ball speed, the dribble height, repetition rate (e.g., dribbles per second), dribble power or other similar characteristics by analyzing the trajectory of the ball, i.e., the change in the detected ball's position over subsequent frames of camera data and the corresponding change in time that occurred between subsequent frames. In one embodiment, the object tracker 1562 can determine the repetition rate by counting the number of times that the ball has corresponding downward (e.g., away from the dribble hand) and upward (e.g., toward the dribble hand) trajectories associated with the user's dribble hand within a predetermined time period. The object tracker 1562 can determine dribble height by using the global coordinate system to measure the distance between the starting and ending of a downward trajectory or an upward trajectory. The object tracker 1562 can determine ball speed by dividing the dribble height by the elapsed time for the ball to complete either an upward or downward trajectory. The object tracker 1562 can determine direction by defining a perpendicular axis with respect to a horizontal plane through the point where the ball changes direction and then measure the angle, relative to the defined axis, with which the ball either begins or ends an upward trajectory or a downward trajectory. The object tracker 1562 can determine dribble power based on the ball speed for a downward trajectory and the movement of the dribble hand toward the ball prior to starting the downward trajectory. The object tracker 1562 can determine a turnover has occurred when the trajectory of the ball shows that it lands in a certain area (e.g., an out-of-bounds area) or transitions directly from a hand of the person dribbling to the hand of a player on an opposing team, noting that players on the opposing team can be identified through jersey color or other identification techniques. In another embodiment, the dribbling characteristics for the dribbling motion can be determined based on information relating to the direction of gravity and information relating to the location of the athletic playing surface. In still other embodiments, still other techniques can be used to calculate the dribbling characteristics of the dribbling motion.

The object tracker 152 can correlate each measured dribbling characteristic with the player's left or right hand. Thus, statistics based on the user's left and right hand can be determined. As an example, the computing device 1504 can determine the user's dribbling speed, dribbling height, turnover ratio, or other characteristics for either his left or right hand. Thus, if desired, a player can see how his performance dribbling with his left hand compares with his performance dribbling with his right hand.

Once the object tracker 1562 has determined the characteristics from the dribbling motion, the object tracker 1562 can compare the determined characteristics to the preferred or "proper" characteristics (step 1608) stored in evaluation data 1582 for the training sequence. Based on the comparison between the determined characteristics and the proper characteristics, the object tracker 1562 can then calculate a score for the user (step 1610). The score for the user can be based on how quickly and/or accurately the user can reproduce the displayed training sequence or how the user's dribbling characteristics in the game sequence compare to the proper dribbling characteristics. The scoring of the user's performance can be based on several accuracy factors such as how closely the user replicates the correct sequence, the correct height for the dribbling motion and/or the correct ball placement or trajectory. In addition, the scoring of the user's performance in training mode can also be based on how quickly the user is able to repeat a movement from the training sequence. In contrast, in game mode, additional factors, parameters or statistics, e.g., turnover rate, amount of time with the ball, whether the user is guarded or unguarded, etc., may be used in the scoring of a user's performance. Once the score for the user has been calculated the score can be displayed on the output device 1508 (step 1612). In one embodiment, the score can be displayed on the output device 1508 concurrent with the display of the training sequence to inform the user of how the user is performing with respect to the training sequence.

After the score is displayed to the user, a determination is then made by the computing device 1504 as to whether or not the training or game sequence has ended (step 1614). If the training sequence or game sequence has ended, the process ends. However, if the training sequence or game sequence has not ended, the process returns to step 1604 to identify further dribbling motions from the user that can be evaluated and scored. The repetition of this process can continue until the training sequence or game sequence has ended.

Once the training sequence or game sequence has ended, the computing device 1504 may recommend one or more additional training sequences for the user based on the user's performance, e.g., score, on the completed training sequence or game sequence. More advanced training sequences may be recommended if the user performed well on the completed training sequence or game sequence. Alternatively, one or more remedial training sequences may be recommended if there were particular aspects of the completed training sequence or game sequence in which the user did not perform well.

The computing device 1504 may also provide the user with the option to review a completed training sequence or game sequence. The computing device 1504 can replay a completed training sequence or game sequence on the output device 1508 along with a video of the user's motions during the training sequence or game sequence and the concurrent score calculations based on the user's motions. The user is then able to see the portions of the training sequence or game sequence that the user may have had trouble performing.

In one embodiment, if the tracking system 1500 is used in a game situation, the object tracker 1562 can be used to obtain different types of information associated with the dribbling motions occurring during the game. The object tracker 1562 can provide information on each player's dribbling motion when guarded by a defender (e.g., a defender is within a predetermined distance of the person with the ball and is following the movements of the person with the ball) or when left unguarded (e.g., no defender is within the predetermined distance of the person dribbling the ball). In one embodiment, the object tracker 1562 can also provide information on when the person dribbling the ball is being guarded by more than one defender. In another embodiment, the object tracker 1562 can also determine whether the person dribbling the ball is being tightly guarded or being loosely guarded. The object tracker 1562 can make a determination of tight guarding if the defender is located within a first predetermined distance range of the person dribbling the ball. If the defender is located outside of the first predetermined distance range (but within a second predetermined distance range that is greater than the first predetermined distance range) the object tracker 1562 can make a determination of loose guarding.

The object tracker 1562 can provide information on each player's dribbling motion when guarded by a particular defender. The object tracker 1562 can use information, such as facial recognition data, shape data or pattern data, from the computer vision logic 1564 to identify the defender guarding the person dribbling the ball. In one embodiment, the object tracker 1562 can identify a defender by initially determining whether the player has a different color or type of uniform than the person dribbling the ball (which positive determination would make the player a defender). Once the object tracker 1562 determines that a player is a defender, the object tracker 1562 can distinguish an individual defender from the other defenders by identifying a particular characteristic associated with the defender, such as by identifying a uniform number of the defender through pattern recognition or identifying the face of the defender through facial recognition.

In addition, once the object tracker 1562 has identified a defender, the object tracker 1562 can review information from computer vision logic 1564 to determine if a particular defensive movement has been performed by the defender. In one embodiment, the object tracker 1562 can determine that a defensive movement has occurred by checking for changes in the position of the defender guarding the person dribbling the ball relative to the movement of the ball itself. For example, the object tracker 1562 can determine if an attempt to steal the ball is occurring (or has occurred) by checking for a movement of the defender's hand toward the position of the ball at about the same time the defender's body is moving toward the person dribbling the ball.

In another embodiment, the object tracker 1562 can determine one or more defensive movements based on a group of corresponding parameters that are determined by the object tracker 1562. Each defensive movement, e.g., a "low lunge forward to steal the ball with two hands," can be defined as sequence or group of defensive characteristics that can include hand, arm, shoulder, and leg motions of various heights, of various speeds, of various directions, of various orientations, of various accelerations or decelerations, with various rotations and/or with various velocities. The object tracker 1562 can determine the particular defensive characteristics associated with a particular defensive movement and then identify the type of defensive movement from the defensive characteristics. Other techniques for detecting defensive movements can be used in other embodiments.

The object tracker 1562 can use the information on the identified defender to correlate dribbling motion statistics of the person dribbling the ball to each defender guarding the person. The object tracker 1562 can provide information on the number of times the defender guarded the person, the cumulative amount of time the defender guarded the person, the dribble types used against the defender, the amount or percentage of time each hand of the person was used to dribble the ball, the number and/or percentage of turnovers, e.g., the number of times the person dribbling the ball loses control of the ball while being guarded by the defender, and the person's dribbling attributes against the defender. With respect to the provided information of the dribbling attributes, the object tracker 1562 can provide information on the ball speed, dribble height, repetition rate and power of the person's dribbling motion for each defender. The provided information on the dribbling attributes can include an average value, a range of values extending from a minimum value to a maximum value and/or the value occurring for the longest time period. In another embodiment, the object tracker 1562 can provide similar information for when the person dribbling the ball is unguarded.

Various techniques can be used to track the performance of a player relative to a particular defender. As an example, by analyzing the images captured by the cameras 1504, the object tracker 1562 can identify the player and each defender using player identification techniques described in more detail above. When the player has possession of the ball as evidenced by the ball appearing in the player's hands from the images or moving along a trajectory indicative of a dribble by the player (e.g., leaving the player's hand and returning to a hand of the player after bouncing off of the floor of the dribbling area), the object tracker 1562 may analyze the images to determine the player's distance from each identified defender. The defender that is closest to the player may be identified as the defender who is guarding the player with the ball if he is within a predetermined distance of the player with the ball. If desired, the defender may be required to be within predetermined distance for at least a certain time period before a guarding determination is made in order to prevent defenders who briefly pass by the player while guarding other players from being mistakenly identified as guarding the player with the ball. Other techniques for determine whether a particular defender is guarding the player with the ball are possible in other embodiments. As an example, the body orientation of the defender may be a factor in determining whether he or she is guarding the player with the ball. In this regard, a defender facing the player with the ball for an extended time period is likely to be guarding him. The object tracker 1562 may be configured to determine that a defender is guarding the player when he is facing the player within a predefined distance of the player for at least a predefined amount of time. In another embodiment, data indicative of the defender (e.g., a jersey number of other identifier of the defender) guarding the player with the ball may be manually input to the computing device 1502 or other device of the system by a user. Yet other techniques are possible in yet other embodiments.

While an identified defender is determined to be guarding the player, the player's dribbling characteristics can be correlated with an identifier that identifies the guarding defender. Thus, characteristics indicative of the player's dribbling performance while being guarded by the identified defender can be determined from the data captured by the system, and the object tracker 1562 can be configured to calculate various scores and statistics indicative of such performance. Over time as the player is guarded by multiple defenders, his dribbling performance against one defender can be compared to his dribbling performance against another defender. Note that the information can be used to help train the person dribbling the ball or for other purposes, such as deciding which defender would be the most effective at guarding the person dribbling the ball.

The object tracker 1562 can determine the impact or effect that particular dribbling characteristics or motions had on a defensive player guarding the player dribbling the ball. For example, the object tracker 1562 can determine if a particular dribbling characteristic was successful or unsuccessful against a defensive player or whether the person dribbling the ball was able to perform particular dribbling characteristics against the defensive player. A dribbling characteristic can be considered successful if the person dribbling the ball was able to advance past the defensive player. In contrast, a dribbling characteristic may be considered unsuccessful if the person dribbling the ball was not able to advance past the defensive player or if the person dribbling the ball committed a turnover, e.g., losing the ball out-of-bounds or losing the ball to the defensive player guarding the person (or another defensive player). Other metrics for gauging the success of a dribbling characteristic are possible in other embodiments.

Figure 5:
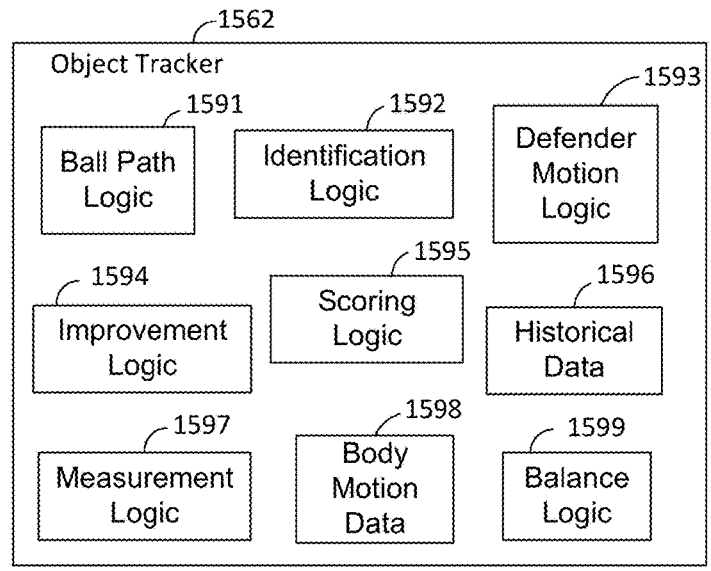
FIG. 5 is a block diagram of an embodiment of the object tracker of the computing device of FIG. 3.

FIG. 5 shows an embodiment of the object tracker 1562 that can be used by computing device 1504. The object tracker 1562 can include ball path logic 1591 for generally determining the path or movement of the ball and the person dribbling the ball, even when the ball and/or the person are concealed from the cameras 1502, identification logic 1592 for determining the location of the ball and/or the offensive and defensive players or persons on the athletic playing surface, and scoring logic 1595 for evaluating the dribbling motion of a person or the performance of a defender guarding the person dribbling the ball and providing a "score" associated with the person's performance. The scoring logic 1595 can evaluate a person's performance based on information from measurement logic 1597. Measurement logic 1597 can be used to measure the capabilities of the person dribbling the ball and/or the capabilities of the person(s) defending the person dribbling the ball. Improvement logic 1594 can use information from measurement logic 1597 and scoring logic 1595 to determine areas where the person can improve his/her performance. The object tracker 1562 can also include defender motion logic 1593 to generally determine the movement and/or actions of a defender, even when the defender is concealed from the cameras 1502, and balance logic 1599 to evaluate the balance and/or fluidity of the person dribbling the ball and/or the person(s) defending the person dribbling the ball.

Historical data 1596 and body motion data 1598 used by the object tracker 1562 can be stored in memory 1566 at the computing device 1504. The historical data 1596 can include information relating to previous movements and actions of the person dribbling the ball during training sequences and/or live play sequences. The historical data 1596 can also include data and information on the movements and actions of the defender(s) guarding the person dribbling the ball. Body motion data 1598 can include information relating to the location and movement of a person (both the person dribbling the ball and the defender(s)) and his/her associated body parts, e.g., head, shoulder, elbow, hand, finger, chest, waist, back, thigh, knee, calf, hip, ankle and foot during the dribbling of the ball or defending the person dribbling the ball. The body motion data 1598 can also include, where applicable, left side and right side information and front and back information associated with the player's body parts.

As previously discussed, the object tracker 1562 can receive camera data 1578, sensor data 1580, information from computer vision logic 1564 and/or other information relating to the ball and the players or persons on the athletic playing surface. The ball path logic 1591 can be used to determine (or approximate) the path of the ball and the person dribbling the ball during the dribbling motion even if the ball or the person cannot be identified by identification logic 1592 based on the camera data 1578. For example, the identification logic 1592 (or the computer vision logic 1564) may not be able to identify the ball or the person because the ball may not be present in camera data 1578. The ball may not be present in the camera data 1578 due to the ball being concealed from the fields of view of the cameras 1502 by the person dribbling the ball, the person(s) guarding the person dribbling the ball and/or one or more other persons on the athletic playing surface. See e.g., FIG. 6. Further, even if the ball is present in the camera data 1578, the identification logic 1592 may not be able to recognize the ball because the ball is obscured in the camera data 1578 due to poor lighting conditions, partial occlusion of the ball and/or blurring as a result of rapid movement of the ball.

In one embodiment, the identification logic 1592 can determine if a foul or other violation occurred during the game by determining if a whistle sound occurs followed by a stoppage of play. The identification logic 1592 may also determine the occurrence of a foul or other violation, by identifying a stoppage of play followed by one or more actions of the referee, e.g., the referee moving toward the scorer's table and making one or more gestures. The identification logic 1592 can determine which player committed the foul or violation and which type of foul or violation occurred based on the hand and arm movements of the referee. For example, the referee may indicate a blocking foul by moving his/her hands onto his/her hips one or more times. The identification logic 1592 may analyze the hand gestures for identifying a foul type (e.g., interpret hand gestures for determining that a blocking foul has occurred when the referee moves his/her hands onto his/her hips within a certain time period after a whistle). The referee may also use hand gestures to indicate the number of the player who committed the foul (e.g., hold up a number of fingers indicting the number), and the identification logic 1592 may interpret such gestures to identify the player who committed the foul. The identification logic 1592 may also be able to determine which player committed the foul or violation and the type of foul or violation that occurred by processing audio information captured from the referee saying the player and type of foul or violation.

The ball path logic 1591 can use the information from the identification logic 1592 to determine the path or trajectory of the ball. When the identification logic 1592 is unable to identify the ball from the camera data 1578, the ball path logic 1591 can determine an expected trajectory or movement of the ball based on the last known location of the ball from identification logic 1592 and other information stored in memory 1566. The ball path logic 1591 can analyze the body position of the person dribbling the ball based on the body motion data 1598 and approximate the expected trajectory of the ball and the time to complete the trajectory based on how the person dribbling the ball is positioned. The ball path logic 1591 can confirm (or reject) the approximate trajectory of the ball once the identification logic 1592 is able to identify the ball from the camera data 1578.

For example, if a person is dribbling the ball behind his back during a game, the ball may not be visible to identification logic 1592 due to occlusion from the dribbler's body as well as occlusion from other players or persons on the athletic playing surface. However, identification logic 1592 may be able to detect the motion of the shoulders, arms, and hands of the dribbler and provide that information to the ball path logic 1591. The ball path logic 1591 can then use the information from the identification logic 1592 and body motion data 1598 to approximate the motion, trajectory, direction, spin, and velocity of the ball while it is not visible or detectable to identification logic 1592 and predict the arrival time and location of the ball on the other side of the dribbler when the ball becomes visible or detectable by the identification logic 1592 from the camera data 1578.

If the ball path logic 1591 receives information from the identification logic 1592 that the ball is in the position expected by the ball path logic 1591 (subject to a margin of error), the ball path logic 1591 can determine that the actual trajectory of the ball followed the approximated trajectory determined by the ball path logic 1591. However, if the ball path logic 1591 receives information from the identification logic 1592 that the ball is in a different location than expected, the ball path logic 1591 can determine that the movement of the ball did not follow the approximated trajectory and can approximate a new trajectory for the ball based on the starting and ending locations for the ball. In addition, the ball path logic 1591 can store information in memory 1566 (possibly as historical data 1596) on the starting and ending positions of the ball, the revised approximated trajectory and the person dribbling the ball. The ball path logic 1591 can then use the stored information on the starting and ending position for the ball and the revised approximated trajectory when formulating an approximated trajectory for the ball when the ball becomes occluded in a similar situation in the future.

In another embodiment, the ball path logic 1591 may be able to determine the trajectory or movement of the ball even if the ball or some (or all) of the person dribbling the ball is occluded in camera data 1578. As an example, the ball may be occluded from view, but the dribbler's elbow may be visible. Movement of the dribbler's arm near the elbow may indicate when the ball has reached the dribbler's hand. In this regard, a change in movement of the dribbler's arm may indicate that the ball has reached the dribbler's hand and is being pushed downward for a dribble. Further, the ball path logic 1591 may calculate the location of the ball at the time it is determined to reach the dribbler's hand based on the location and orientation of the dribbler's elbow. In this regard, the arm length of the dribbler may be predetermined and used by the logic 1591 to determine the ball's distance from the dribbler's elbow. Also, the angle of the dribbler's forearm may indicate the ball's direction from his elbow. By determining various locations of the ball at different times while the ball is occluded, the ball path logic 1591 can estimate the trajectory of the ball between such points.

If desired, the ball path logic 1591 can use computer learning and/or artificial intelligence to establish the most likely paths the ball would travel based on any other current data that is available (e.g., data extracted from camera data 1578 or data from sensor data 1580 such as depth sensor, motion sensor/accelerometer or sound information) or from historical data 1596 that includes information of what the person is most likely to do in a particular situation or environment. In this regard, by analyzing the dribbler's movements over time, the ball path logic 1591 can learn how the dribbler likely responds to certain conditions (such as when he is double teamed, when he drives toward the lane, when a defender attempts to steal the ball, etc.) and then predict the ball movements and trajectories based on such learned tendencies when the ball is occluded from view during similar conditions.

The ball path logic 1591 can analyze the current data and make a determination regarding the expected movement of the ball based on the current conditions associated with the person dribbling the ball. For example, if the person dribbling the ball is being trapped by two defenders (the two defender scenario), the ball path logic 1591 can determine that it will be unlikely for the person dribbling the ball to use a behind-the-back dribble (or other dribble type) in the direction of one of the defenders and determine the available directions that the ball could be dribbled to approximate a likely movement of the ball. The ball path logic 1591 can then evaluated the approximated movement of the ball as described above.

If the ball path logic 1591 is not able to approximate the movement of the ball from the currently available data, the ball path logic 1591 may able to approximate the movement of the ball based on historical data 1596 associated with the person dribbling the ball. In other words, the ball path logic 1591 can determine an approximate movement of the ball based on the previous movements of the person in similar situations. For example, in the two defender scenario, the ball path logic 1591 may determine based on historical data 1596 that the person dribbling the ball usually attempts to dribble between the defenders when confronted by two defenders. Using that determination, the ball path logic 1591 can approximate a trajectory or movement of the ball that has the ball travelling between the defenders. The ball path logic 1591 can then evaluate the approximated movement of the ball as described above.

In one embodiment, the ball path logic 1591 can determine the current position and situation of the person dribbling the ball and determine the possible moves that can be made from that position and situation. The ball path logic 1591 can then determine the probabilities of the person dribbling the ball executing each of the possible moves and use the probability determinations in determining the approximate movement of the ball. For example, in the two defender scenario, there are multiple moves or sequences possible for the person dribbling the ball such as: pick up the ball; cross-over dribble from left to right; cross-over dribble from right to left; front to back between-the-legs dribble from left to right; front to back between-the-legs dribble from right to left; back to front between-the-legs dribble from right to left; back to front between-the-legs dribble from left to right; behind-the-back dribble from left to right; and behind-the-back dribble from right to left. However, the person dribbling the ball, based on their historical data 1596, may only be capable of doing a few of the possible dribble sequences and may not have the requisite skill level and/or may not have used the other possible dribble sequences in the past. The ball path logic 1591 can assign a higher probability to the dribbling sequences previously performed by the person and a lower probability to the other dribbling sequences. In contrast, a more skilled player be able to perform most or all of the possible dribbling sequences and the ball control logic 1591 would assign different probabilities to the possible sequences. The ball path logic 1591 can then use the assigned probabilities to determine an approximate movement for the ball. The ball path logic 1591 can then evaluate the approximated movement of the ball for accuracy as described above.

In one embodiment, the ball path logic 1591 can process video/audio/depth sensing/motion sensing sequences that include tagged descriptors provided by a reviewer of the camera data 1578 which describe dribble patterns, dribbler patterns and/or levels of dribbling capability in a quantitative or qualitative way. The ball path logic 1591 can use the tagged descriptors in building a knowledge base for machine learning and/or artificial intelligence. The degree of tagging provided in the video/audio/depth sensing/motion sensing data can vary between no tagging, light tagging, or full tagging. As the knowledge base for the ball path logic 1591 increases, the machine learning and/or artificial intelligence of the ball path logic 1591 can be used to "track" the movements of the ball and the person dribbling the ball for longer periods when the ball and the person are mostly occluded from the view of cameras 1502 or sensors 1514.

In another embodiment, the ball path logic 1591 may be able to use data from only a single sensor (e.g., a camera 1502, audio detector, depth sensor or motion sensor) to accomplish ball movement determinations across an entire athletic playing surface even though the ball and/or aspects of the person dribbling the ball are occluded much of the time. The ball path logic 1591 can use one or more of the techniques described above to determine the movement of the ball with only an occasional detection of the ball by identification logic 1592 to locate/relocate the ball between analysis techniques.

In still another embodiment, the ball path logic 1591 can use machine learning and/or artificial intelligence to analyze the historical data 1596 to uncover patterns and trend information. The ball path logic 1591 can then use the pattern and trend information when determining the probabilities associated with the location and movement of the ball.

The defender motion logic 1593 can be used to identify the specific person guarding the person dribbling the ball and determine or approximate the movements and actions of the identified defender. The defender motion logic 1593 can determine the movements and actions of one or more defenders (once identified) guarding a person dribbling the ball even if the defender(s) cannot be continuously identified by identification logic 1592 from the camera data 1578. For example, the identification logic 1592 (or the computer vision logic 1564) may not be able to identify a defender because the defender may not be present in camera data 1578. The defender may not be present in some portions of the camera data 1578 due to the defender being concealed from the field of view of the cameras 1502 by the person dribbling the ball and/or one or more other persons on the athletic playing surface. Further, even if the defender is present in the camera data 1578, the identification logic 1592 may not be able to identify the defender because the defender is obscured in the camera data 1578 due to poor lighting conditions and/or partial occlusion of the defender (particularly those features used to identify the defender).

Prior to determining the movements of a defender, the defender motion logic 1593 may determine whether a defensive player is defending the person dribbling the ball. The defender motion logic 1593 can determine whether a defensive player or players is guarding the person dribbling the ball based on the distance between the defensive player and the person dribbling the ball and the position and/or orientation of the defensive player with respect to the person dribbling the ball. For example, a defensive player within 5 feet of the person dribbling the ball and facing the person dribbling the ball can be considered to be guarding the person dribbling the ball. Once the defender motion logic 1593 has determined a defensive player is a defender of the person dribbling the ball, the defender motion logic 1593 can identify the specific defender using information from the identification logic 1592 regarding the identity of the player. The defender motion logic 1593 can use identification information directly from the identification logic 1592 or the computer vision logic 1564 to specifically identify the defender. In another embodiment, the defender motion logic 1593 can perform the identification of the specific defender based on the information from the identification logic 1592. For example, the defender motion logic may use body motion data 1598 to identify the specific defender since each player can have a unique body motion profile. The defender motion logic 1593 can then designate and store specific movements and actions of the specific defender in responding to actions of the person dribbling the ball. The measurement logic 1597 can use the stored information by the defender motion logic in evaluating the performance of the defender.

In one embodiment, the defender motion logic 1593 can identify the location in a 3-D space of the defender's fingers, hands, elbows, shoulders, chest, head, waist, back, thighs, knees, calves, hips, ankles, feet, and/or other body parts. In addition, once the individual body parts have been identified, the defender motion logic 1593 can determine relative locations of the identified body parts to each other. The defender motion logic 1593 can provide the information of the defender's body to the body motion data 1598 for use by the object tracker 1562. For example, the balance logic 1599 can use the body motion data 1598 to measure or infer the balance of the defender and the defender's ability to respond. In one embodiment, the defender's balance could be relative to the balance of a normal person from a chosen group or could be relative to the "normal" balance of the particular defender using historical data 1596. In another embodiment, since the players on the athletic playing surface alternate between offense and defense, the defender motion logic 1593 can specifically identify each of the players and store corresponding information for each of the players.

The defender motion logic 1593 can use the information from the identification logic 1592 to determine the movement and/or actions of the defender. In addition, the defender motion logic 1593 can assign parameters to the defender movements and/or actions and categorize the outcome of the particular defensive movements and/or actions. Some examples of categories that can be used are: the defender committed a foul, which can include information on the foul type and other parameters associated with the foul; the defender stole the ball from the person dribbling the ball (a steal), which can include information on the action that resulted in the steal and other parameters associated with the steal; the defender maintained defensive position (e.g., the defender is facing the person dribbling the ball and is located at a position between the person and the basketball goal) on the person dribbling the ball; the defender did not maintain defensive position on the person dribbling the ball; or other activity outcome descriptors.

When the identification logic 1592 cannot provide specific information on the location of the defender, possibly due to occlusion or lighting, the defender motion logic 1593 can determine an expected movement of the defender based on the last known location of the defender from identification logic 1592 and other information stored in memory 1566. The defender motion logic 1593 can use computer learning to establish the most likely movements and/or actions the defender would perform based on any other current data that is available (e.g., data extracted from camera data 1578 or data from sensor data 1580 such as depth sensor, motion sensor/accelerometer or sound information) or from historical data 1596 that includes information on what the person is most likely to do in a particular situation or environment.

The defender motion logic 1593 can analyze the current data and make a determination regarding the expected movement and/or actions of the defender based on the current conditions associated with the defender. For example, if the defender is guarding a person dribbling to the defender's right and the defender has been previously moving to the right, the defender motion logic 1593 can determine that the defender may continue to move to the right and that it is unlikely for the defender to slide to the left. Thus, the defender motion logic 1593 can use computer learning and/or artificial intelligence to determine the possible directions the defender could move, look at the outcome of the defensive sequence based on the location of the defender from identification logic 1592 and determine which defensive movement was actually used.

If the defender motion logic 1593 is not able to approximate accurately the movement and/or actions of the defender from the currently available data, the defender motion logic 1593 may be able to approximate the movement and/or actions of the defender based on historical data 1596 associated with the defender. In other words, the defender motion logic 1593 can determine an approximate movement and/or action for the defender based on the previous movements of the person in similar situations. For example, when the person dribbling the ball is moving to the defender's left, the defender motion logic 1593 may determine based on historical data 1596 that the defender will likely take a step back and then move to the left. Using that determination, the defender motion logic 1593 can approximate the movement and/or actions of the defender as backwards and then to the left. The defender motion logic 1593 can then evaluate the approximated movement of the defender once information on the defender becomes available from the identification logic 1592.

In one embodiment, the defender motion logic 1593 can determine the current position and situation of the defender relative to the person dribbling the ball and determine the possible moves and/or actions that can be made from that position and situation. The defender motion logic 1593 can then determine the probabilities of the defender executing each of the possible moves and/or actions and use the probability determinations in predicting or otherwise estimating the approximate moves or actions of the defender. For example, if the defender is guarding a person making a cross-over dribble from right to left (as seen by the defender), there are a number of motions and/or actions the defender could make such as: a low lunge forward to steal the ball with two hands; a low lunge forward with the right hand to tip the ball up; a low lunge forward with the right hand to tip the ball sideways; a slide to the left maintaining distance with the person dribbling the ball; a step back to allow more space and prevent the person dribbling the ball from advancing to the hoop; a jump forward to block the vision of the person and prevent a pass or shot; a jump left or right or up to prevent a pass by the person; or a "broken ankles" stumble because the dribble move was so effective that the defender lost their defensive position and/or balance. However, the defender, based on their historical data 1596, may only be capable of doing a few of the possible movements or actions and may not have the requisite skill level and/or may not have used the other possible movements or actions in the past. The defender motion logic 1593 can assign a higher probability to the movements and/or actions previously performed by the person and a lower probability to the other movements and/or actions. In contrast, a more skilled player may be able to perform most or all of the possible movements and/or actions and the defender motion logic 1593 would assign different probabilities to the possible sequences. The defender motion logic 1593 can then use the assigned probabilities to predict an approximate movement and/or action for the defender. The defender motion logic 1593 can then evaluate the approximated movement of the defender once information on the defender becomes available from the identification logic 1592 to determine whether the prediction is accurate.

In one embodiment, the defender motion logic 1593 can process various sequences, e.g., video sequences, audio sequences, depth sensor sequences or motion sensor sequences, about a defender that includes tags (or tagged descriptors) with information about defender patterns and/or defender capabilities in a quantitative or qualitative way. The tags provide information and/or a description about the content (e.g., the actions of the defender) of a sequence and can be associated with the sequence (or file) similar to metadata. A sequence can have a single tag describing the actions of the defender or multiple tags describing different actions of the defender. The tags can correspond to actions or categories of actions, e.g., a steal or block, which are recognized by the defender motion logic 1593. A user can review the sequences (which may be obtained from camera data 1578) and apply the appropriate tag(s) to the defender's actions in the sequence. When applying a tag, the user can select from a predetermined list of tags and/or can create their own tag. The degree of tagging provided in the sequence data can vary between no tagging, light tagging, or heavy tagging. The defender motion logic 1593 can use the tagged descriptors in building a knowledge base for machine learning and/or artificial intelligence. As the knowledge base for the defender motion logic 1593 increases, the machine learning and/or artificial intelligence of the defender motion logic 1593 can be used to "track" the movements of the defenders for longer periods when the defenders are mostly occluded from the view of cameras 1502 or sensors 1514.

In another embodiment, the defender motion logic 1593 may be able to use data from only a single sensor (e.g., a camera 1502, audio detector, depth sensor or motion sensor) to accomplish defender movement and/or action determinations across an entire athletic playing surface even though the defender may be occluded much of the time. The defender motion logic 1593 can use one or more of the techniques described above to determine the movements of the defender with only an occasional detection of the defender by identification logic 1592 to assess/reassess the position of the defender between analysis techniques.

The measurement logic 1597 can be used to analyze data about the person dribbling the ball and the defender of the person dribbling the ball. The measurement logic can use information from identification logic 1592, ball path logic 1591, defender motion logic 1593, balance logic 1599, historical data 1596, body motion data 1598 and/or evaluation data 1582 to analyze the performance and capabilities of the person dribbling the ball and the defender(s) of the person dribbling the ball.

The measurement logic 1597 can determine the proficiency of the person dribbling the ball with respect to many different dribbling characteristics. For example, some of the dribbling characteristics of the person dribbling the ball that can be evaluated by the measurement logic 1597 can include the person dribbling the ball performing very low dribbling, very fast dribbling, fast changes in dribbling speed (i.e., acceleration or deceleration), fast changes in dribbling direction, multiple fast changes in dribbling direction, stopping a forward or sideways motion very quickly while maintaining a dribble, fast transitions from dribbling to shot release, fast transitions from dribbling to pass (for a wide variety of passing types and situations), and/or any other desired dribbling characteristic. Each of these dribbling characteristics can be described by one or more quantitative parameters. For example, very low dribbling can be characterized by maintaining the dribble height (actual or average) under a predefined value, very fast dribbling can be characterized by the person maintaining the dribbles per second above a predefined value, fast changes in dribbling speed can be characterized by completing a change in the dribbles per second within a predefined time period, fast changes in dribbling direction can be characterized by completing a change of direction within a predefined time period, multiple fast changes in dribbling direction can be characterized by completing several changes of direction within a predefined time period, stopping a forward or sideways motion very quickly while maintaining the dribble can be characterized by ending an active motion (while maintaining a dribbling motion) within a predefined time period and/or predefined distance, fast transitions from dribbling to shot release can be characterized by the time to transition from a dribbling motion to a shooting motion being within a predefined time period, and fast transitions from dribbling to pass can be characterized by the time to transition from a dribbling motion to a passing motion being within a predefined time period. Each of the dribbling characteristics can further be characterized by some type of qualitative or quantitative score from scoring logic 1595 that indicates the level of skill required to achieve proficiency over the dribbling characteristic. In one embodiment, the measurement logic 1597 can provide the person's dribbling characteristics relative to individual defensive players.

The measurement logic 1597 can also determine the proficiency of the person dribbling the ball with respect to the person's ability to achieve the same pattern of dribbling every time. The measurement logic 1597 can evaluate a person's ability to complete training sequences that can require specified dribble speeds, specified dribble heights, specified changes in speed, specified changes in dribble position, specified changes in head/shoulder/elbow/hand/finger/chest/waste/thigh/knee/ankle/foot position and/or specified maintenance of balance. The measurement logic 1597 can also determine the proficiency of the person dribbling the ball by evaluating whether the person is able to repeat the same dribble move in a highly effective way in game situations. Each of these situations can be described by a quantitative parameter or set of parameters. For example, to evaluate the person's proficiency in completing a training sequence, the measurement logic 1597 may individually evaluate the person's completion of each of the individual tasks (which can correspond to one or more parameters) in the training sequence. Each of these parameters can further be characterized by some type of qualitative or quantitative score from scoring logic 1595 that indicates the level of skill required to achieve proficiency over the dribbling moves.

The measurement logic 1597 can evaluate the performance of the person dribbling the ball based on the number and type of different movements that are performed by the person dribbling the ball in response to the same or similar situation. In other words, the measurement logic 1597 can determine the person's proficiency in not repeating the same pattern of dribbling every time. The ability of the person dribbling the ball to vary the dribbling motions used in response to particular situations can be used to limit the effectiveness of the defensive player in identifying and responding to repetitive patterns in the person's dribbling motion. The measure of the person's ability not to repeat the same pattern of dribbling can be described by one or more quantitative parameters. Each of these parameters can further be characterized by some type of qualitative or quantitative score from scoring logic 1595 that indicates the level of skill required to achieve that non-repetitive capability.

In one embodiment, the measurement logic 1597 can determine the number of assists by the person dribbling the ball. An assist can be defined as the last pass to a person that directly leads to the scoring of a basket. In addition, for an assist, the person receiving the pass must move directly toward the basket in a "scoring motion," which may include dribbling the ball. The measurement logic 1597 can be used to determine when the person dribbling the ball makes a pass to a teammate and when the teammate receiving the pass takes (and makes) a shot at the basket (i.e., scores a field goal). The measurement logic 1597 can track the motions and actions of the teammate receiving the pass and determine if the teammate receiving the pass has performed a "scoring motion." The measurement logic 1597 can determine a scoring motion based on the movements and actions of the teammate involved with the scoring of a basket and numerous other factors such as the amount of time between receiving the pass and scoring the basket, the movement of the teammate towards the basket and the location where the shot was taken relative to the location where the pass was caught. The measurement logic 1597 can also track the passer's number of assists for each of his/her teammates. In another embodiment, the measurement logic 1597 can determine whether the person dribbling the ball has taken (and made) a shot at the basket.

The measurement logic 1597 can also evaluate the effectiveness of the person dribbling the ball with respect to the defender(s) guarding the person. The measurement logic 1597 can use information from balance logic 1599 to determine changes in the body orientation and position and balance of the defender as a result of a dribbling move. For example, a person dribbling the ball may cause a defender to stumble and/or fall after performing a particular dribbling move, e.g., a cross-over dribble, which enables the person dribbling the ball to "defeat" the defender and progress to the basket or an open position on the court. The measure of the ability of the person dribbling the ball to negatively impact a defender's balance and position and orientation to enable the person dribbling the ball to advance to the basket can be described by one or more quantitative parameters. Each of these parameters can further be characterized by some type of qualitative or quantitative score from scoring logic 1595 that indicates the level of ability in disrupting the defender's body orientation and position and balance.

The measurement logic 1597 can also determine the ability of the person dribbling the ball to complete one or more related objectives such as a high number of assists and/or a low number of turnovers. The objectives can be calculated based on the person's overall performance or with respect to individual defensive players. The measure of a dribbler's ability to achieve the related objectives and to determine how much of the achievement of the higher-order objectives is due to dribbling expertise can be described by a quantitative parameter or set of parameters. For example, the measurement logic 1597 can determine the effectiveness of a dribbling move in generating an open passing lane (that results in a score by the person receiving the ball) for the person dribbling the ball when evaluating the number of assists. Each of these parameters can further be characterized by some type of qualitative or quantitative score from scoring logic 1595 that indicates the level of skill required to achieve the higher order objectives.

The measurement logic 1597 can determine the proficiency of the defender with respect to many different defensive characteristics. For example, some of the defensive characteristics of the defender that can be evaluated by the measurement logic 1597 can include the defender having a very fast forward speed, very fast forward acceleration, very fast forward lunge acceleration, very low forward lunge, very fast side defensive speed, very fast side defensive acceleration, very low side defensive position, very fast change of direction of side movement, very fast ending of side movement, very fast reverse speed, very fast transition from dribbling defensive position to pass interception position, very fast transition from dribbling defensive position to shot defensive position, and/or any other desired defensive characteristic. Each of these defensive characteristics can be described by one or more quantitative parameters. For example, very fast forward speed can be characterized by maintaining a forward speed (actual or average) above a predefined value, very fast forward acceleration can be characterized by having an acceleration rate above a predefined value, very fast forward lunge acceleration can be characterized by having a lunge acceleration rate above a predefined value, very low forward lunge can be characterized by maintaining the defender's forward lunge position below a predefined height, very fast side defensive speed can be characterized by maintaining a lateral speed, e.g., a speed in moving to the side, above a predefined value, very fast side defensive acceleration can be characterized by having a side acceleration rate above a predefined value, very low side defensive position can be characterized by maintaining a side defensive position below a predefined height, very fast change of direction of side movement can be characterized by switching from one side movement to an opposed sided movement within a predefined time period, very fast ending of side movement can be characterized by stopping a side movement within a predefined time or predefined distance, very fast reverse speed can be characterized by maintaining a reverse speed (actual or average) above a predefined value, very fast transition from dribbling defensive position to pass interception position can be characterized by the time to transition from a dribbling defensive position to a passing defensive position being within a predefined time period, very fast transition from dribbling defensive position to shot defensive position can be characterized by the time to transition from a dribbling defensive position to a shot defensive position being within a predefined time period. Each of the defensive characteristics can further be characterized by some type of qualitative or quantitative score from scoring logic 1595 that indicates the level of skill required to achieve proficiency over the defensive characteristic. In one embodiment, the measurement logic 1597 can provide the defender's defensive characteristics relative to individual offensive players (e.g., a specific person dribbling the ball).

The measurement logic 1597 can also determine the proficiency of the defender with respect to the defender's ability to achieve one or more patterns of defensive movements. The measurement logic 1597 can evaluate a defender's ability to complete training sequences that can require specified forward speeds, specified defensive heights, specified changes in speed, specified changes in defensive position, specified changes in body position and/or specified maintenance of balance. The measurement logic 1597 can also determine the proficiency of the defender by evaluating whether the person is able to repeat the same defensive movements or actions in a highly effective way in game situations. Each of these situations can be described by a quantitative parameter or set of parameters. For example, to evaluate the defender's proficiency in completing a training sequence, the measurement logic 1597 may individually evaluate the defender's completion of each of the individual tasks (which can correspond to one or more parameters) in the training sequence. Each of these parameters can further be characterized by some type of qualitative or quantitative score from scoring logic 1595 that indicates the level of skill required to achieve proficiency over the defensive movements and/or actions.

The measurement logic 1597 can evaluate the performance of the defender based on the number and type of different movements that are performed by the defender in response to the same or similar situation. In other words, the measurement logic 1597 can determine the defender's proficiency in not repeating the same defensive movements and/or actions for a given situation. The ability of the defender to vary the defensive movements and/or actions used in response to particular situations can be used to limit the effectiveness of the person dribbling the ball in identifying and responding to repetitive patterns in the defender's defensive movements. The measure of the person's ability not to repeat the same pattern of defensive movements can be described by one or more quantitative parameters. Each of these parameters can further be characterized by some type of qualitative or quantitative score from scoring logic 1595 that indicates the level of skill required to achieve that non-repetitive capability.

The measurement logic 1597 can also determine the ability of the defender to complete one or more related objectives such as a such as a high number of steals, high number of blocks, high number of deflected passes, high number of deflected shots, and/or high number of traps. The objectives can be calculated based on the defender's overall performance or with respect to individual offensive players. The measure of a defender's ability to achieve the related objectives and to determine how much of the achievement of the related objectives is due to defensive expertise can be described by a quantitative parameter or set of parameters. For example, the measurement data 1597 can determine the effectiveness of a defensive move in positioning the defender to either deflect a pass from the person dribbling the ball or steal the pass from the person dribbling the ball. Each of these parameters can further be characterized by a qualitative or quantitative score from scoring logic 1595 that indicates the level of skill required to achieve the related objectives.

In one embodiment, the measurement logic 1597 can determine the use of a "screen" on the defender of the person dribbling the ball and the defender's response to the screen. A screen is a known basketball term that generally refers to a play or situation when an offensive player, referred to hereafter as "offensive screener," without the ball establishes a stationary position to block the path of the defender of another offensive player, referred to hereafter as the "offensive screen target," moving towards the screener who is setting the screen. The offensive screen target can either have the ball or can be attempting to receive a pass from the person with the ball. The measurement logic 1597 can detect the occurrence of a screen by determining the establishment of a stationary position by the offensive screener near the defender of the offensive screen target such that the path of the defender intersects with the stationary position of the offensive screener.

Note that there are various factors that can be used in the determination of whether a screen has occurred. As an example, the probability of a screen may be increased if the defender contacts the offensive screener within a predefined time after establishment of the screener's stationary position. In addition, the orientation of the offensive screener to the defender of the offensive screen target may be indicative of whether a screen has occurred. In this regard, an offensive screener often faces the defender when setting a screen so as to help increase the width of the screen and, thus, the screen's effectiveness of disrupting the path of the defender. In addition, the proximity of the offensive screen target relative to the offensive screener may indicate whether a screen is occurring. In this regard, an offensive screen target often passes within a close proximity or even contacts the offensive screener when passing the offensive screener. Thus, detecting that the offensive screen target has passed the offensive screener within a predefined distance may indicate the occurrence of a screen. The measurement logic 1597 may detect any of the events described above as indicative of a screen and may detect the occurrence of a screen based on any combination of such factors. As an example, in assessing whether a stationary position of the offensive screener constitutes a screen, the measurement logic 1597 may calculate a screen score that is increased by a certain amount for each detection of an event that indicates the occurrence of the screen while the offensive screener is in the stationary position. If the screen score exceeds a predefined threshold, then the measurement logic 1597 may detect the occurrence of a screen. In other embodiments, other techniques for detecting an occurrence of a screen are possible.

When a screen is detected, the measurement logic 1597 may assess how various players performed during the screen and track the results over time to determine a score, referred to herein as "screen score," indicating each player's skill level in executing screens or defending against screens. As an example, the measurement logic 1597 can determine how the defensive player responded to the screen. The measurement logic 1597 can determine if the defensive player goes "above" or "below" the screen, stops motion or switches defensive assignment with another defensive player such that the defensive player is no longer guarding the person dribbling the ball.

In this regard, as is commonly understood in basketball, it is generally desired for a defensive player to defend against a screen by going "above" the screen. Going "above" the screen generally refers to when the defender passes the offensive screener on the same side as the offensive screen target. This is often the more challenging course of action for the defender as it is often difficult to "fight through" the screen in order to stay on the same side of the offensive screener as the offensive screen target. However, going "above" the screen often allows the defender to maintain a good defensive position with respect to the offensive screen target by staying close to the offensive screen target through the screen. In contrast going "below" the screen generally refers to when the defender passes the offensive screener on the opposite side of the offensive screener as the offensive screen target. This is often simpler for the defender to achieve, relative to going "above" the screen, but it results in separation between the defender and the offensive screen target, which is undesirable as it often gives the offensive screen target an opportunity to make a play such as taking an undefended shot on the goal or driving toward the goal.

The measurement logic 1597 can determine if the defensive player goes above or below the screen by determining the position of the defensive player relative to the offensive screener and the offensive screen target. For example, based on the images captured by the cameras or otherwise, the measurement logic 1597 may determine whether the defender and the offensive screen target pass on the same side of the offensive screener. If so, the measurement logic 1597 determines that the defender has gone "above" the screen. If the measurement logic 1597 determines that the defender and the offensive screen target pass on opposite sides of the offensive screener, then the measurement logic 1597 determines that the defender has gone "below" the screen.

The measurement logic 1597 can track how the defender responds to being screened over time and can also track how the defensive player responds to screens from individual offensive players. As an example, the measurement logic 1597 may track the number of times that the defender goes "above" screens during a given time period and provide a parameter indicative of such number (e.g., a percentage of screens that the defender goes "above" the screen). The measurement logic 1597 may similarly track other outcomes, such as the number of times that the defender goes "below" the screen or otherwise defends against the screen. The measurement logic 1597 can also determine various parameters indicative of the effectiveness of the defender's responses to screens. As an example, for each screen, the measurement logic 1597 may determine whether the defender was able to maintain a defensive position with respect to the offensive screen target (e.g., stayed within a certain distance of the offensive screen target and/or stayed between the offensive screen target and the goal) or whether the offensive screen target was able to perform a certain action coming off of the screen (e.g., within a predefined time period after passing the offensive screener), such as taking an open shot at the goal or driving toward the goal unguarded by the defender. The measurement logic 1597 may track the number of times that one or more outcomes occur over a given time period and provide a parameter indicative of such number (e.g., a percentage of screens that a certain outcome occurs). The parameters tracked by the measurement logic 1597 may be correlated with the offensive players so that the defender's play against the offensive players can be ascertained and assessed. As an example, the data provided by the measurement logic 1597 may be used to determine how many times the defender went "over" a screen (or performed some other action) set by a particular screener relative to the number of times that he went "under" such a screen. Thus, the performance of the defender against screens set by the particular screener can be assessed.

The measurement logic 1597 can similarly track the motions and actions of the offensive players involved with the screen. In this regard, the same or similar actions and events tracked by the measurement logic 1597 for assessing the defender's play can be used to assess the play of the offensive players. As an example, the measurement logic 1597 may track the number of times that the offensive screen target caused his defender to go "below" the screen or perform some other action during the screen. The measurement logic 1597 can also track the number of times that the offensive screen target is able to take a shot at the basket, dribble towards the basket, make a pass to another offensive player, possibly resulting in an assist, or perform some other action coming off of the screen.

The measurement logic 1597 can similarly evaluate the performance of the offensive screener. As an example, the measurement logic 1597 can determine the proximity of the offensive screener to the defender of the offensive screen target. The measurement logic 1597 can determine the speed with which the offensive screener is able to set the screen, i.e., how fast does the screener obtains a stationary position, and the timing with which the screener sets the screen, i.e., the time between when the screener establishes the screen and the time when the defender arrives at the screener or contacts the screener. The measurement logic 1597 can evaluate the general effectiveness of the offensive screener by tracking one or both of the responses of the offensive screen target and the defender and can also evaluate the effectiveness of the screener with respect to individual teammates and/or individual defenders. In particular, similar to the tracking of the defender described above, the measurement logic 1597 can correlate the parameters tracked for a given offensive player to the screen defenders in order to track the offensive player's performance against certain defenders. As an example, the data provided by the measurement logic 1597 may be used to determine how many times a particular offensive screener, offensive screen target, or a pair of offensive screener and offensive screen target caused a particular defender to go "under" a screen (or perform some other action).

In one embodiment, the measurement logic 1597 can evaluate the effectiveness of the offensive screener by determining when the screener performed illegal screens. The measurement logic 1597 can determine an illegal screen, sometimes referred to as a "moving" screen, based on whether the person was called for a foul. The measurement logic 1597 can also determine illegal screens by evaluating the movements of the offensive screener regardless of whether a foul is called. The measurement logic 1597 can determine an illegal screen by determining an extent to which the screener's hips or torso moves during the screen. The measurement logic 1597 can also detect an illegal screen if the screener moves (e.g., "sticks out") a hip, knee, leg, elbow, etc., while in the stationary position to impede the progress of the defender in an impermissible way.

In one embodiment, the measurement logic 1597 can use entropy modeling to determine when dribbling unpredictability, screening unpredictability and/or defender unpredictability is beneficial or detrimental to the player and/or team. For example, the measurement logic 1597 may determine that dribbling unpredictability in a player is beneficial because the unpredictability of the player can make it more difficult for a defensive player to "scout" the movements of the player. However, the measurement logic 1597 may determine that the dribbling unpredictability of a player is detrimental if the player does not have good control of the ball and generates a high number of turnovers or low number of scores or assists.

The improvement logic 1594 can be used to analyze data about the person dribbling the ball and the defender of the person dribbling the ball and recommend methods to improve either dribbling capability or defensive capability and to predict the amount of improvement in dribbling capability or defensive capability. The improvement logic 1594 can use information from identification logic 1592, ball path logic 1591, defender motion logic 1593, balance logic 1599, measurement logic 1597, historical data 1596, body motion data 1598 and/or evaluation data 1582 to identify opportunities to improve the performance and capabilities of the person dribbling the ball and the defender(s) of the person dribbling the ball.

The improvement logic 1594 can recommend particular practice routines, game drills and technique modifications depending on the specific performance area of requiring improvement. For example, if the measurement logic 1597 indicates that a person is dribbling the ball too high such that the ball is being stolen frequently by the defender, the improvement logic 1594 can recommend one or more training or practice routines that require the person to dribble with a lower dribbling height. In another example, if the measurement logic 1597 indicates that a defender often allows a dribbler to easily move past them on the way to the basket, the improvement logic 1594 can recommend one or more training or practice routines that function to improve lateral defensive speed.

The improvement logic 1594 can map specific training or practice routines to performance areas. The improvement logic 1594 can also map skill level designations, e.g., needs significant improvement, to the training or practice routines. Then, when the improvement logic 1594 identifies a performance area that requires improvement, the improvement logic 1594 can select a training or practice routine that has been mapped to the performance area requiring improvement. The improvement logic 1594 can also narrow the selection of the training or practice routine from the mapping based on the assessment of the performance area by measurement logic 1597 such that the selected training or practice routine better matches the actual skill level of the person.

In another embodiment, the improvement logic 1594 may not be able to recommend a specific practice routine, game drill and technique modification because there may be multiple areas requiring improved performance and/or there may be multiple practice routines, game drills and technique modifications that can be used to address a specific area requiring improvement. For example, if a dribbler often has their shot blocked or tipped when taking a jump shot off the dribble, the problem might be an inability to get sufficient separation from the defender prior to picking up the dribble, or the problem might be a slow transition from dribble to shooting position, or the problem might be a slow shot release, or the problem might be a low shot release (as determined by measurement logic 1597 based on the trajectory of the ball for the shot and the location of the shooter's body parts such as his/her hand and/or elbow), or the problem might be a combination of the above challenges. In another example, if a defender is often unable to disrupt a jump shot off the dribble, e.g., block or tip the jump shot, the problem might be an inability to limit the separation by the person dribbling the ball prior to the jump shot, or the problem might be a slow transition from dribbling defensive position to shooting defensive position, or the problem might be a off-center hand placement, or the problem might be a combination of the above challenges.

In situations where there is not a readily identifiable improvement regimen or multiple possible improvement regimens, the improvement logic 1594 can select other players, e.g., other dribblers or defenders, who have previously shown similar dribbling or defensive performance with a subsequent improvement in performance (e.g., an improvement above a threshold amount) based on the dribbling or defensive characteristics determined by the measurement logic 1597. The improvement logic 1594 can store information on the training or practice routines completed by each person in historical data 1596. The improvement logic 1594 can also store information of the person's performance level after completion of a training or practice routine and correlate the change in the player's performance level to the training or practice routine. The improvement logic 1594 can review the selected players' practice techniques and improvement pace from historical data 1596 to determine an optimal set of practice techniques for the person dribbling the ball or the defender being analyzed by the improvement logic 1594.

In another embodiment, the improvement logic 1594 can use information from scoring logic 1595 to determine performance areas requiring the most improvement. The improvement logic 1594 can review the historical data 1596 for other players, e.g., other dribblers or defenders, who have a similar performance area requiring improvement and their corresponding practice techniques to determine an optimal set of practice techniques and predicted improvement for the area requiring improvement.

In one embodiment, the historical data 1596 can include a large database of many players with many parameter types undergoing many practice and game dribbling regimens that can all be quantitatively measured. The improvement logic 1594 can implement a methodology to maximize the improvement process in the most efficient way. For example, the improvement logic 1594 may identify patterns across multiple quantitative dimensions in order to describe the specific problem and then prescribe the best approach for improvement.

Balance logic 1599 can be used to measure and/or categorize the effectiveness of the player's balance on the performance of the player. For example, if the person dribbling the ball has good balance, the person can more effectively move left, right, back, forward, up, down, and with different dribbling techniques at different speeds, accelerations, heights, and angles. In one embodiment, balance logic 1599 can use machine learning and/or artificial intelligence to measure and/or categorize a player's balance directly or indirectly.

In one embodiment, the balance logic 1599 may directly assess the balance of player by determining and analyzing the center of mass of the player relative to the player's body. The balance logic 1599 can determine a player has good balance if the player's center of mass does not rapidly change position in response to movements of the player. The balance logic 1599 may also make indirect determinations regarding balance based on factors such as fluidity, rapid acceleration, foot placement and/or sluggishness. For example, if the balance logic 1599 determines that a player has motions that are fluid, the balance logic 1599 can determine that the player has better balance than a player whose motions are less fluid. Similarly, if the balance logic 1599 determines that the player has rapid acceleration in one or more movements, the balance logic 1599 can determine that the player has better balance. The balance logic 1599 may also make a determination of balance regarding a player based on the foot placement of the player in response to a variety of different situations.

In addition, the balance logic 1599 can also be used to determine the defender's ability to respond to particular situations. The defender's ability to respond to a situation is dependent on the actions of the person dribbling the ball. For example, if the person dribbling ball is attempting a shot with the ball (as determined by ball path logic 1591), the balance logic 1599 can determine if a defender is in a low position or an extended position and thus determine the defender's ability to respond. For example, if the defender is already in an extended position as determined by balance logic 1599, the the balance logic 1599 may determine that defender does not have the desired muscle contraction available to respond appropriately to an up movement by the person dribbling the ball. Further, the balance logic 1599 can also determine whether the defender's ability to respond is limited by the physical positions of other defenders or the physical position of the person dribbling the ball.

In one embodiment, historical data 1596 can include data obtained during a training sequence in a confined training space, e.g., a bounded dribbling area 1516. An example of a confined training space is described by: U.S. patent application Ser. No. 14/874,555, entitled "Systems and Methods for Monitoring Objects in Athletic Playing Spaces" and filed on Oct. 5, 2015, which is incorporated herein by reference. When historical data 1596 is obtained during a training sequence, information pertaining to the movement of the ball in relation to the movement of the person can be more easily obtained since the camera(s) 1502 and the sensors 1514 can be placed at appropriate locations to reduce and possibly eliminate any occlusion of the ball or the person. The complete tracking of the ball and the person in the historical data 1596 can permit the ball path logic 1591 to more accurately determine probabilities of movement when the ball or person becomes occluded. The ball path logic 1591 can determine the expected movement of the ball based on information in historical data 1596 that is similar to the location and position of the dribbler when the ball becomes occluded.

Figure 6:
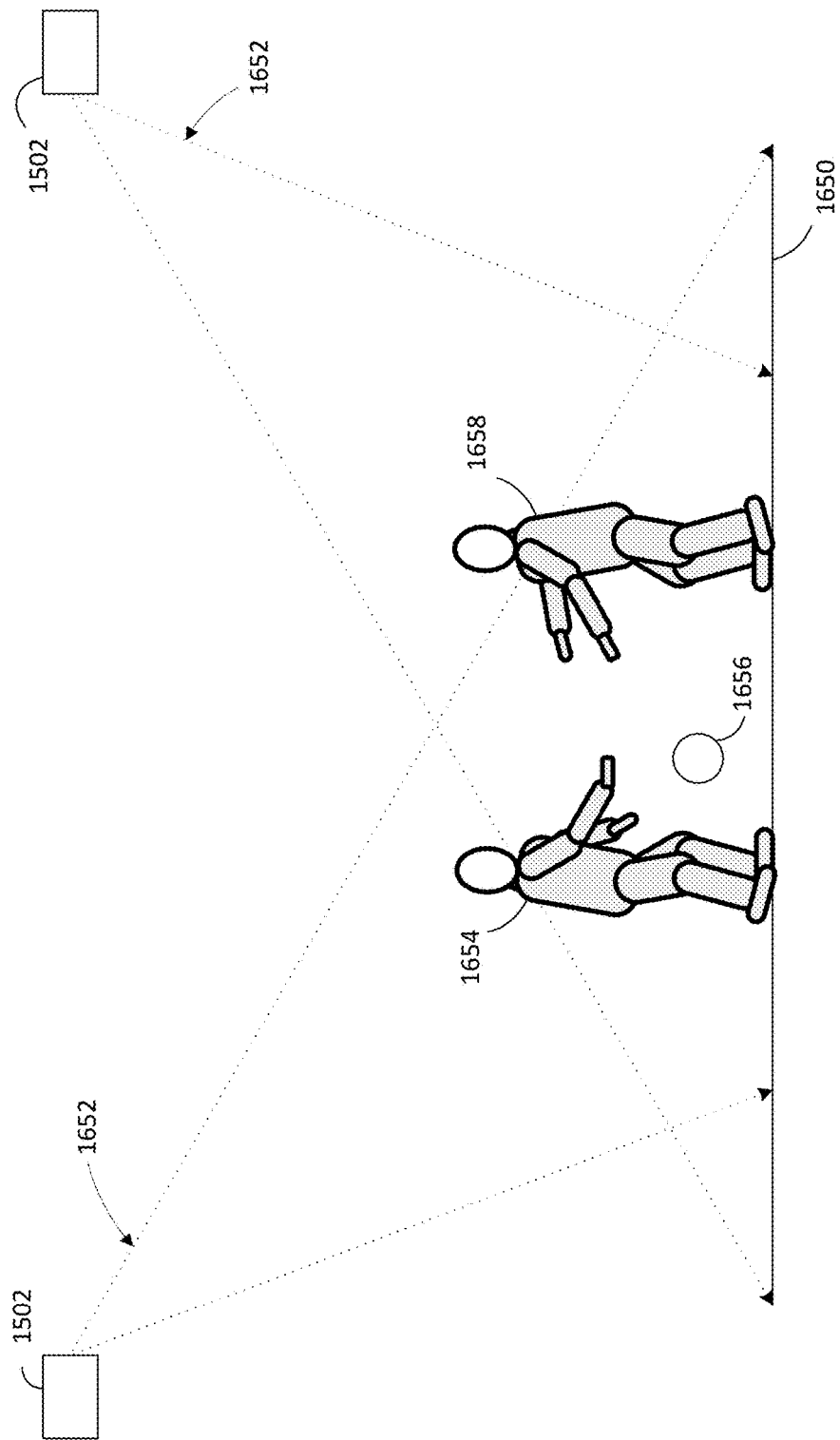
FIG. 6 is an illustration of an offensive and defensive basketball player on an athletic playing surface.

FIG. 6 shows an offensive and defensive basketball player on an athletic playing surface. As can be seen in the embodiment of FIG. 6, cameras 1502 can be located at each end of an athletic playing surface 1650 and can capture the entire athletic playing surface 1650 within the fields of view 1652 of the cameras 1502. The cameras 1502 can also capture an offensive player 1654, the ball 1656 and a defensive player 1658. The cameras 1502 may be able to capture a lot of information or very little information on the offensive player 1654, the ball 1656 and the defensive player 1658 depending on their locations on the athletic playing surface 1650 and their positions with respect to the cameras 1502. As discussed above, the ball 1656 may be occluded from the fields of view 1652 of the cameras, as shown in FIG. 6, based on the positions of the offensive player 1654 and the defensive player 1658. The cameras 1502 can also capture information on other players (not shown) on the athletic playing surface 1650. The images of the offensive player 1654, the ball 1656 and the defensive player 1658 captured by the cameras 1502 can be processed by the object tracker 1562 as discussed above.

Figure 7:
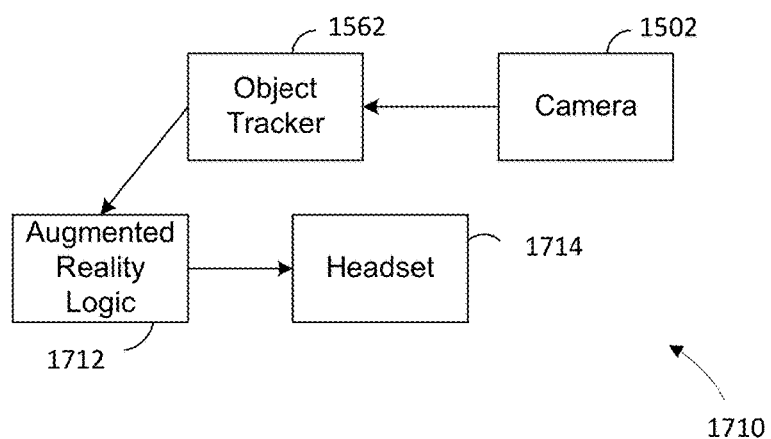
FIG. 7 is a block diagram of an embodiment of augmented reality system for the tracking system.

In one embodiment, the computing device 1504 can use an augmented reality system to provide a training sequence that simulates a game situation for a person dribbling the ball or a defender. As shown in FIG. 7, an augmented reality system 1710 can include augmented reality logic 1712. The augmented reality logic 1712 can be implemented in software, hardware, firmware or any combination thereof. The augmented reality logic 1712 can be part of the object tracker 1562 or be a stand-alone system in memory 1566. The augmented reality logic 1712 can transmit, using communication interface 1576, images associated with a simulated game situation to a headset 1714 worn by the user. The headset 1714 can have a closed configuration, e.g., a full-sized helmet, that prevents the user from seeing any of the surrounding physical environment, or the headset 1714 can have an open configuration, e.g., a pair of glasses, that permits the user to see the surrounding environment while a projection of the game is occurring. In one embodiment, the headset 1714 can be an output device 1508. The system 1500 can capture the user's responses to the simulated game situation with cameras 1502 and/or sensors 1514 and process the captured information with object tracker 1562 as described above. The object tracker 1562 can provide information on the user's responses to the augmented reality logic 1712, which can update the simulation provided to the user.

The augmented reality logic 1712 can match the skill of the simulated defender to the particular skills to be developed in the training sequence. For example, the skill level of the simulated defender may be set lower than the skill level of the person in the training sequence to permit the person dribbling the ball to develop new moves that are effective against less proficient defenders. In contrast, the skill level of the simulated defender can be set greater than the person dribbling the ball to permit the person to increase their skill or to learn ball protection sequences. The augmented reality logic 1712 can also be used to simulate multiple defenders during the training sequence. In one embodiment, the skill level of the simulated defender can be based on the skill of an actual defender as represented by the defender's defensive characteristics collected and stored in historical data 1596. In another embodiment, the skill level of the simulated defender can be based a combination of skills of several different defenders or can be generated by the augmented reality logic 1712 to provide the desired set of skills in the simulated defender.

The augmented reality logic 1712 can also match the skill of the simulated dribbler to the particular skills to be developed by the defender in the training sequence. For example, the skill level of the simulated dribbler may be set lower than the skill level of the defender in the training sequence to permit the defender to develop new moves that are effective against less proficient dribblers. In contrast, the skill level of the simulated dribbler can be set greater than the defender to permit the defender to increase their skill or to learn defensive sequences. The augmented reality logic 1712 can also be used to simulate multiple offensive players during the training sequence. In one embodiment, the skill level of the simulated dribbler can be based on the skill of an actual dribbler as represented by the dribbler's dribbling characteristics collected and stored in historical data 1596. In another embodiment, the skill level of the simulated dribbler can be based a combination of skills of several different dribblers or can be generated by the augmented reality logic 1712 to provide the desired set of skills in the simulated dribbler.

In a further embodiment, the augmented reality logic 1712 can also be used to add simulated court lines or a simulated basketball hoop to environments where no court is actually present during the training sequence. By providing simulated boundaries and/or the basketball hoop to the headset 1714 of the user when such conditions are not physically present, the augmented reality logic 1712 can provide a more realistic training environment and increase the benefit of the training sequence for the user.

The augmented reality logic 1712 can develop the skill level of the simulated defender or person dribbling the ball in the training sequence by using machine learning and/or artificial intelligence in conjunction with historical data 1596. For example, factors such as the balance, footwork, foot placement, and/or acceleration of the player can be used in addition to the player's movements, e.g., body part placement and/or orientation, and/or ball motion can be used in establishing the skill level of the simulated player(s).

In still another embodiment, the augmented reality system 1710 can be used to allow one or more players to operate in an environment which has the appearance of a 10 or more player practice. In a further embodiment, the augmented reality system 1710 can be used by two separate people in different locations to simulate a one-on-one contest between the people. One of the persons can be an offensive player and the other person can be a defensive player. The cameras 1502 can capture information on each of the players at their respective locations and provide the information to their corresponding object tracker 1562 which can process the information. The object tracker 1562 can then provide the information, e.g., location on the court, player stance, player movements, etc., on the one player to the augmented reality logic 1712 used by the other player which can then use the information from the object tracker 1562 on the one player to simulate the location and movements of the one player in the simulation provided to the other player. For example, a defender can be located at the foul line and in a stationary position while the dribbler can be located at the "top of the key" and moving towards the defender. The object tracker 1562 in the system 1500 of the defender can capture the defender's location on the court and the defensive stance and position of the defender. The information on the defender can then be provided to the augmented reality system 1710 of the dribbler, which can then generate a simulation of the defender at the defender's location at the foul line and with the defender's stationary position for the dribbler. Similarly, the object tracker 1562 in the system 1500 of the dribbler can capture the dribbler's location on the court and the dribbling stance and movement of the dribbler. The information on the dribbler can then be provided to the augmented reality system 1710 of the defender, which can then generate a simulation of the dribbler at the dribbler's location at the top of the key and with the dribbler's movement toward the defender. Similar techniques may be used with other numbers of players in any number of locations. As an example, a five-on-five game may be simulated with each player at a different court or other physical location and viewing simulations of the other nine players.

In one embodiment, as the information capture rate from the cameras 1502 and/or sensors 1514 increases, fewer cameras 1502 and/or sensors 1514 are required to obtain the same amount of information and/or data for processing. For example, a camera 1502 that captures 1000 frames per second would provide more data to computing device 1504 than a camera 1502 that captures 30 frames per second.

In another embodiment, an audio sensor can be used to determine one or more dribbling characteristics. For example, an audio sensor can detect a change in the sound associated with the dribbling motion and the object tracker 1562 can use the detected change in sound to determine a corresponding change in a dribbling characteristic such as dribbling rate or speed. In addition, the audio sensor may also be used to assist with determining the ball trajectory when the ball is occluded from view. For example, the audio sensor can detect the sound the ball makes when striking the floor and provide that information to identification logic 1592 and ball path logic 1591 to assist in determining the trajectory of the ball. The sound of the ball striking the floor can be used with other detected information (such as the detection of the ball leaving a person's hands) to determine the speed of the ball based on the time difference between the detected information and when the sound of the ball striking the floor is detected. Further, the detection of the ball striking the floor in a repetitive pattern may indicate that the person is dribbling the ball, even if the ball is occluded from the view of the cameras 1502.

Information passed between the different components in the system may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IrDA, WiFi and HomeRF.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

Now, therefore, the following is claimed:

1. A system for tracking dribbling, comprising:
at least one camera configured to capture images of a player dribbling an object at the sporting event;
memory;
at least one processor configured to receive image data defining the images from the at least one camera, the at least one processor configured to identify the object within the images and to identify a plurality of dribbles of the object by the player based on the images, wherein the at least one processor, for each of the plurality of dribbles, is configured to identify which hand of the player is used for dribbling the object and to determine at least one parameter indicative of dribble performance for the identified hand, wherein the at least one processor is configured to determine whether a defender is guarding the player based on an orientation of the defender relative to the player, and wherein the at least one processor is configured to store the at least one parameter for each of the plurality of dribbles in the memory and to calculate, based on the stored at least one parameter and whether the defender is determined to be guarding the player, at least one value characterizing a dribble performance for one hand of the player during the plurality of dribbles; and
an output interface configured to provide, based on the at least one value, an output indicative of dribble performance of the player for the plurality of dribbles.

2. The system of claim 1, wherein the at least one processor is configured to estimate a trajectory of the object when the object is occluded in the images.

3. The system of claim 1, wherein the output includes the at least one value characterizing the dribble performance and indicates that the at least one value is correlated with the one hand.

4. A system for tracking dribbling, comprising:
at least one camera configured to capture images of a player dribbling a basketball;
at least one processor configured to receive image data defining the images from the at least one camera, the at least one processor configured to identify the basketball within the images and to identify a plurality of dribbles of the basketball by the player based on the images, wherein the at least one processor, for at least one of the plurality of dribbles, is configured to determine at least one parameter indicative of dribble performance, wherein the at least one processor is configured to determine whether a defender is guarding the player based on a distance between the player and the defender, and wherein the at least one processor is configured to determine a value characterizing a dribble performance of the player based on the at least one parameter and whether the defender is determined to be guarding the player during the at least one of the plurality of dribbles; and
an output interface configured to provide an output indicative of the dribble performance of the player based on the at least one parameter, wherein the output includes the value and indicates that the value is correlated with the defender.

5. The system of claim 4, wherein the at least one processor is configured to estimate a trajectory of the basketball when the basketball is occluded in the images.

6. The system of claim 4, further comprising memory, wherein the at least one processor is configured to store a plurality of parameters in the memory, each of the plurality of parameters characterizing a dribble performance of the player for a respective one of the plurality of dribbles, wherein the output is based on each of the plurality of parameters.

7. The system of claim 4, wherein the output includes a value characterizing a dribble performance of the player for the plurality of dribbles, and wherein the output indicates that the value is correlated with at least one defender guarding the player.

8. The system of claim 4, further comprising memory, wherein the at least one processor is configured to identify the defender, and wherein the at least one processor is configured to store the at least one parameter in the memory and to correlate the at least one parameter with an identifier that identifies the defender.

9. The system of claim 4, wherein the at least one processor is configured to determine an orientation of the defender relative to the player based on the images, and wherein the at least one processor is configured to determine whether the defender is guarding the player during the at least one of the plurality of dribbles based on the orientation.

10. The system of claim 4, wherein the at least one processor is configured to identify which hand of the player is used for dribbling the basketball during the at least one of the plurality of dribbles.

11. The system of claim 10, wherein the at least one processor is configured to determine, based on the identified plurality of dribbles, a first parameter indicative of a dribbling performance of the player with his or her left hand and a second parameter indicative of a dribbling performance of the player with his or her right hand.

12. The system of claim 10, further comprising memory, wherein the at least one processor is configured to store the at least one parameter in the memory and to correlate the at least one parameter with the identified hand.

13. The system of claim 4, wherein the at least one processor is configured to identify at least one body part of the player in the images and to determine a location of the body part based on the images, and wherein the at least one processor is configured to determine a dribble type for the at least one dribble based on the location of the at least one body part.

14. The system of claim 13, further comprising memory, wherein the at least one processor is configured to store the at least one parameter in the memory and to correlate the at least one parameter with the dribble type.

15. The system of claim 4, wherein the at least one processor is configured to determine an orientation of the defender relative to the player based on the images, and wherein the at least one processor is configured to determine whether the defender is guarding the player during the at least one of the plurality of dribbles based on the orientation.

16. A system for tracking dribbling, comprising:
at least one camera configured to capture images of a player dribbling a basketball;
memory;
at least one processor configured to receive image data defining the images from the at least one camera, the at least one processor configured to identify the basketball within the images and to identify a plurality of dribbles of the basketball by the player based on the images, wherein the at least one processor, for at least one of the plurality of dribbles, is configured to determine at least one parameter indicative of dribble performance, wherein the at least one processor is configured to identify a defender and to determine whether the defender is guarding the player, wherein the at least one processor is configured to determine a value characterizing a dribble performance of the player based on the at least one parameter and whether the defender is determined to be guarding the player during the at least one of the plurality of dribbles, and wherein the at least one processor is configured to store the at least one parameter in the memory and to correlate the at least one parameter with an identifier that identifies the defender; and an output interface configured to provide an output indicative of the value, wherein the output includes the value, and wherein the output indicates that the value is correlated with the defender.

17. A system for tracking dribbling event, comprising:

at least one camera configured to capture images of a player dribbling a basketball;

at least one processor configured to receive image data defining the images from the at least one camera, the at least one processor configured to identify the basketball within the images and to identify a plurality of dribbles of the basketball by the player based on the images, wherein the at least one processor, for at least one of the plurality of dribbles, is configured to determine at least one parameter indicative of dribble performance and to determine whether a defender is guarding the player based on an orientation of the defender relative to the player, wherein the at least one processor is further configured to determine a value characterizing a dribble performance of the player for the plurality of dribbles based on the at least one parameter and whether the defender is determined to be guarding the player; and an output interface configured to provide an output indicative of the dribble performance of the player based on the at least one parameter, wherein the output includes the value and indicates that the value is correlated with the defender.

18. A method for tracking dribbling, comprising:

capturing images of a player dribbling a basketball with at least one camera;

receiving image data defining the images from the at least one camera;

identifying the basketball within the images with at least one processor;

identifying a plurality of dribbles of the basketball by the player based on the identified basketball within the images;

for the at least one of the identified dribbles, determining with the at least one processor which hand of the player is used for dribbling the basketball;

for the at least one of the identified dribbles, determining with the at least one processor at least one parameter indicative of dribble performance for one hand of the player based on the images;

determining with the at least one processor whether a defender is guarding the player based on an orientation of the defender relative to the player;

calculating with the at least one processor a value characterizing a dribble performance for the one hand based on the at least parameter and the determining whether the defender is guarding the player; and providing, via an output interface, an output indicative of dribble performance of the player for the plurality of dribbles based on the value.

19. The method of claim 18, further comprising:

identifying the basketball in a plurality of frames of the image data;

determining a respective location of the basketball for each of the plurality of frames; and estimating a trajectory of the basketball between the at least two of the plurality of frames when the basketball is occluded in the images based on the determined locations of the basketball for the plurality of frames.

20. The method of claim 18, further comprising:

storing, in memory, the at least one parameter; and correlating the at least one parameter in the memory with an identifier identifying the defender.

21. The method of claim 18, further comprising identifying at least one body part of the player in the images with the at least one processor;

determining a dribble type with the at least one processor based on the trajectory of the basketball relative to a location of the at least one body part;

storing, in memory, the at least one parameter; and correlating the at least one parameter in the memory with an identifier identifying the dribble type.

22. The method of claim 18, further comprising determining, with the at least one processor based on the identified plurality of dribbles, a first parameter indicative of a dribbling performance of the player with his or her left hand and a second parameter indicative of a dribbling performance of the player with his or her right hand.

23. A method for tracking dribbling, comprising:

capturing images of a player dribbling a basketball with at least one camera;

receiving image data defining the images from the at least one camera;

identifying the basketball within the images with at least one processor;

identifying a plurality of dribbles of the basketball by the player based on the identified basketball within the images;

for the at least one of the identified dribbles, determining at least one parameter indicative of dribble performance for the player based on the images with the at least one processor;

providing, via an output interface, an output indicative of the dribble performance based on the at least one parameter;

determining with the at least one processor whether a defender is guarding the player during at least one of the identified dribbles based on the images, wherein the at least one parameter is based on the determining whether the defender is guarding the player;

storing, in memory, the at least one parameter; and correlating the at least one parameter in the memory with an identifier identifying the defender; and determining a distance between the player and the defender with the at least one processor based on the images, wherein the determining whether the defender is guarding the player is based on the distance.

24. A system for tracking dribbling, comprising:

at least one camera configured to capture images of a player dribbling a basketball;

at least one processor configured to receive image data defining the images from the at least one camera, the at least one processor configured to identify the basketball within the images and to identify a plurality of dribbles of the basketball by the player based on the images, wherein the at least one processor is configured to identify which hand of the player is used for each of the identified plurality of dribbles, wherein the at least one processor is configured to determine, based on the identified plurality of dribbles, a first parameter indicative of a dribbling performance of the player with his or her left hand and a second parameter indicative of a dribbling performance of the player with his or her right hand, and wherein the at least one processor is configured to determine whether a defender is guarding the player based on an orientation of the defender relative to the player; and an output interface configured to provide an output based on at least one of the first parameter and the second parameter and based on whether the defender is determined to be guarding the player.

25. A method for tracking dribbling, comprising:

capturing images of a player dribbling a basketball with at least one camera;

receiving image data defining the images from the at least one camera;

identifying the basketball within the images with at least one processor;

identifying a plurality of dribbles of the basketball by the player based on the identified basketball within the images;

for the at least one of the identified dribbles, determining at least one parameter indicative of dribble performance for the player based on the images with the at least one processor;

determining with the at least one processor an orientation of a defender relative to the player based on the images;

determining with the at least one processor whether the defender is guarding the player during the at least one of the identified dribbles based on the orientation;

determining with the at least one processor a value indicative of dribble performance of the player based on the at least one parameter and the determining whether the defender is guarding the player; and providing an output indicative of the value via an output interface.

26. The method of claim 25, further comprising:

determining with the at least one processor a distance between the player and the defender based on the images; and wherein the determining whether the defender is guarding the player is based on the determining the distance.

* * * * *